United States Patent
Nakamura et al.

(10) Patent No.: US 6,824,967 B2
(45) Date of Patent: Nov. 30, 2004

(54) METHOD OF PREPARING DYE SOLUTION, AND METHODS OF PRODUCING SILVER HALIDE EMULSION AND SILVER HALIDE PHOTOGRAPHIC MATERIAL

(75) Inventors: Tetsuo Nakamura, Kanagawa (JP); Katsuyuki Takada, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/642,183

(22) Filed: Aug. 18, 2003

(65) Prior Publication Data

US 2004/0043339 A1 Mar. 4, 2004

(30) Foreign Application Priority Data

Aug. 19, 2002 (JP) ........................................ 2002-238176

(51) Int. Cl.[7] .............................. G03C 5/18; G03C 5/26

(52) U.S. Cl. ........................ 430/449; 430/517; 430/569; 430/570; 430/572; 430/556; 430/631; 430/546

(58) Field of Search ................................. 430/449, 570, 430/572, 577, 569, 559, 631, 546

(56) References Cited

FOREIGN PATENT DOCUMENTS

JP          1-196039 A        8/1989

*Primary Examiner*—Geraldine Letscher
(74) *Attorney, Agent, or Firm*—Sughrue Mion, PLLC

(57) ABSTRACT

A method of preparing a dye solution having a high concentration and high stability, wherein a counter ion-free dye and a base having a pKa value of from 6.6 to 9.0 are dissolved in a solvent having a relative dielectric constant of at least 10 at 20° C., and a silver halide emulsion and a silver halide photographic material which are reduced in fogging by the use of the dye solution prepared in accordance with the aforesaid method.

11 Claims, No Drawings

METHOD OF PREPARING DYE SOLUTION, AND METHODS OF PRODUCING SILVER HALIDE EMULSION AND SILVER HALIDE PHOTOGRAPHIC MATERIAL

FIELD OF THE INVENTION

The present invention relates to a method of preparing a dye solution, and to a silver halide emulsion, a silver halide photosensitive material and their respective production methods.

BACKGROUND OF THE INVENTION

Hitherto, much effort has been expended to increase the sensitivities of silver halide photosensitive materials and to reduce color contamination after photographic processing. Photography has so far been required to ensure higher sensitivity and higher image quality on one hand, and on the other, recent years have seen strengthening requirements for photographic processing that the processing speed should be increased and the amounts of liquid wastes should be minimized from the viewpoint of environmental friendliness in particular. Therefore, the arts of spectrally sensitizing silver halide grains to higher degrees without any adverse effects, including fogging and color contamination, are of increasing importance.

Sensitizing dyes used for spectral sensitization are known to have great effect upon properties of silver halide photographic materials. It is already disclosed by us in JP-A-2001-312023 that high sensitivity and low color contamination are both achieved at the same time by the silver halide photographic material containing at least two sensitizing dyes having dissociable groups other than sulfonic acid group.

Each of the sensitizing dyes disclosed in the document cited above, though can be dispersed directly in emulsions, is generally dissolved in an appropriate solvent, such as methanol, ethanol, methyl cellosolve, acetone, water, pyridine or a mixture of two or more thereof, and then added to an emulsion. Therein, the dissolving operation may be carried out in the presence of an additive such as an acid, a base or a surfactant, or with the aid of ultrasonic waves. As to methods usable for adding such a compound, U.S. Pat. No. 3,469,987 discloses the method of dissolving the compound in a volatile organic solvent, dispersing the solution obtained into a hydrophilic colloid, and adding the resulting dispersion to an emulsion; JP-B-46-24183 discloses the method of dispersing the compound into a water-soluble solvent, and adding the dispersion obtained to an emulsion; U.S. Pat. No. 3,822,135 discloses the method of dissolving the compound in a surfactant, and adding the solution obtained to an emulsion; JP-A-51-74624 discloses the method of dissolving the compound with the aid of a red shift compound, and adding the solution obtained to an emulsion; and JP-A-50-80826 discloses the method of dissolving the compound in an acid free of water in a substantial sense, and adding the solution obtained to an emulsion. Further, the methods disclosed in U.S. Pat. Nos. 2,912,343, 3,342,605, 2,996,287 and 3,429,835 can be applied in adding the compounds to emulsions. Moreover, as disclosed in JP-A-7-140580, the compounds can take the form of a solid particulate dispersion in adding them to emulsions.

When sensitizing dyes have no counter ions, however, they are slightly soluble in generally used solvents, such as water and methanol. For solutions of such dyes to have practicable concentrations, it is required that bases such as sodium hydroxide and triethylamine are added in making the solutions and dissociate dissociable groups contained in the dyes. In the case where the dyes are dissolved completely according to the foregoing method, the solutions obtained have high pH of the order of 10–11. In such a high pH range, the dyes are apt to decompose. Therefore, silver halide emulsions to which the dye solutions prepared in accordance with the foregoing method are added are liable to suffer deterioration in photographic properties, such as a fog increase and soft gradation enhancement. On the other hand, lowering the pH of the dye solutions produces a dye precipitation problem.

Therefore, it has been strongly desired to find out methods of making solutions of sensitizing dyes having concentrations high enough to practical use under pH as close to neutral as possible.

SUMMARY OF THE INVENTION

Objects of the invention are to provide a fog-reduced silver halide photographic emulsion and a silver halide photographic material including the emulsion, and to provide a method of preparing a highly stable solution containing a high concentration of dye. This method is usable as a means in providing the emulsion and the photographic material.

As a result of our intensive studies, it has been found that the foregoing objects of the invention could be achieved by the embodiments (1) to (11) described below.

(1) A method of preparing a dye solution, which comprises dissolving a counter ion-free dye and a base having a pKa value of from 6.6 to 9.0 in a solvent having a relative dielectric constant of at least 10 (preferably, 90 or less) at 20° C.

(2) The method of preparing a dye solution as described in the item (1) above, wherein the dye is a compound represented by the following formula (I):

$$\text{Dye}\text{—}((A)_r Q)_q \quad (I)$$

wherein Dye represents a dye moiety; A represents a linkage group; Q represents a dissociable group; r represents 0 or 1 and q represents an integer of 1 or more (preferably, 4 or less), provided that at least one Q is selected from the group consisting of —COOH, —CONHSO$_2$R, —SO$_2$NHCOR, —SO$_2$NHSO$_2$R and —CONHCOR and R represents an alkyl group, an aryl group, a heterocyclic group, an alkoxy group, an aryloxy group, a heterocyclyloxy group or an amino group.

(3) The method of preparing a dye solution as described in the item (1) or (2), wherein the dye is a compound represented by the following formula (II):

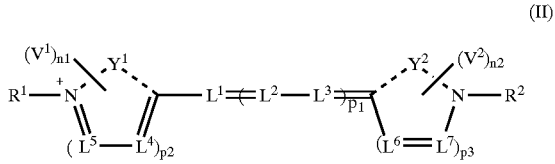

wherein $R^1$ and $R^2$ each represent a substituted or unsubstituted alkyl, aryl or heterocyclic group, provided that at least one of $R^1$ and $R^2$ is substituted with —COOH, —CONHSO$_2$R$^3$, —SO$_2$NHCOR$^3$, —SO$_2$NHSO$_2$R$^3$ or —CONHCOR$^3$; R$^3$ represents an alkyl group, an aryl group, a heterocyclic group, an alkoxy group, an aryloxy group, a heterocyclyloxy group or an amino group; $Y^1$ and $Y^2$ each represent atom group constituting a 5- or 6-membered nitrogen-containing heterocyclic ring which may be condensed together with a carbon ring or the other heterocyclic ring; $V^1$ and $V^2$ each represents a substituent; $n^1$ and $n^2$ each represent an integer of 0 or more (preferably 4 or less, more preferably 0 or 1), and when $n^1$ and $n^2$ each are 2 or more, $V^1$s and $V^2$s each may be the same or different; $L^1$, $L^2$, $L^3$, $L^4$, $L^5$, $L^6$ and $L^7$ each represent a methine group; and $p^1$ represents 0, 1, 2 or 3, and $p^2$ and $p^3$ each represent 0 or 1, and when $p^1$ is 2 or 3, the repeated $L^2$s and $L^3$s each may be the same as or different from each other.

(4) The method of preparing a dye solution as described in any one of the items (1) to (3), wherein the pKa value of the base is from 7.0 to 8.0.

(5) The method of preparing a dye solution as described in anyone of the items (1) to (4), wherein the base is a compound represented by the following formula (III), (IV), (V) or (VI):

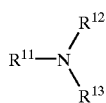

(III)

wherein $R^{11}$, $R^{12}$ and $R^{13}$ each represent a hydrogen atom, or a substituted or unsubstituted alkyl group, provided that at least one of $R^{11}$, $R^{12}$ and $R^{13}$ is an alkyl group substituted with a radical having a σm value of 0 or more (preferably 0.8 or less);

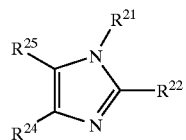

(IV)

wherein $R^{21}$, $R^{22}$, $R^{24}$ and $R^{25}$ each represent a hydrogen atom or a substituent, and $R^{24}$ and $R^{25}$ may combine with each other to form a carbon ring or a heterocyclic ring;

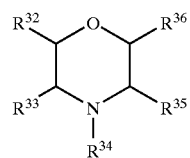

(V)

wherein $R^{32}$, $R^{33}$ $R^{34}$, $R^{35}$ and $R^{36}$ each represent a hydrogen atom or a substituent;

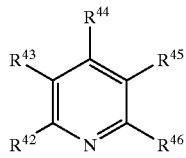

(VI)

wherein $R^{42}$, $R^{43}$, $R^{44}$, $R^{45}$ and $R^{46}$ each represent a hydrogen atom or a substituent, provided that at least two of $R^{42}$, $R^{43}$, $R^{44}$, $R^{45}$ and $R^{46}$ are unsubstituted alkyl groups or alkyl groups substituted with radicals having σm values of 0 or less (preferably −0.2 or more), and $R^{42}$ and $R^{43}$, $R^{43}$ and $R^{44}$, $R^{44}$ and $R^{45}$, or $R^{45}$ and $R^{46}$ may combine with each other to form a carbon ring or a heterocyclic ring.

(6) The method of preparing a dye solution as described in any one of the items (1) to (5), wherein the solvent is one of a solvent having a relative dielectric constant of at least 20 at 20° C. and a mixture of two or more solvents having a relative dielectric constant of at least 20 at 20° C.

(7) The method of preparing a dye solution as described in the item (6), wherein the solvent is one of water, methanol, and a mixture of water and methanol.

(8) A method of producing a silver halide emulsion, which comprises adding at least one of dye solutions prepared by the method described in any one of the items (1) to (7).

(9) A silver halide emulsion comprising at least one of dye solutions prepared by the method described in any one of the items (1) to (7).

(10) A method of producing a silver halide photographic material, which comprises coating on a support at least one silver halide emulsion layer containing the silver halide emulsion described in the item (9).

(11) A silver halide photographic material, comprising a support and at least one silver halide emulsion layer containing the silver halide emulsion described in the item (9).

DETAILED DESCRIPTION OF THE INVENTION

Dyes usable in the invention are illustrated below.

Any dyes may be used in the invention as far as they have no counter ions. Examples of such dyes include cyanine dyes, styryl dyes, hemicyanine dyes, merocyanine dyes, trinuclear merocyanine dyes, tetranuclear merocyanine dyes, rhodacyanine dyes, complex cyanine dyes, complex merocyanine dyes, allopolar dyes, oxonol dyes, hemioxonol dyes, squalium dyes, croconium dyes, azamethine dyes, coumarin dyes, arylidene dyes, anthraquinone dyes, triphenylmethane dyes, azo dyes, azomethine dyes, spiro compounds, metallocene dyes, fluorenone dyes, flugide dyes, perylene dyes, phenazine dyes, phenothiazine dyes, quinone dyes, indigo dyes, diphenylmethane dyes, polyene dyes, acridine dyes, acridinone dyes, diphenylamine dyes, quinacridone dyes, phenoxazine dyes, phthaloperylene dyes, porphyrin dyes, chlorophyll dyes, phthalocyanine dyes and metal complex dyes.

It is appropriate that the dyes used in the invention have at least one dissociable group, which can be dissociated in a state of solution, per molecule.

The dyes used in the invention are preferably represented by the foregoing formula (I).

The dissociable group Q in formula (I) is a group capable of becoming an anionic radical, or a radical capable of having negative charge, by dissociation (e.g., by dissociation of proton from Q). For instance, Q is a proton-dissociative acidic group, at least 90% of which is dissociated in the pH range of 5 to 10. Examples of such a proton-dissociative acidic group include a sulfo group (—SO$_3$H), a carboxyl group (—COOH), a sulfato group (—OSO$_3$H), a phosphonic acid group (—PO(OH)$_2$), a phosphoric acid group (—OPO(OH)$_2$), a boronic acid group (—B(OH)$_2$), a boric acid group (—OB(OH)$_2$), an amino group substituted with an electron-attracting group (such as a sulfonylcarbamoyl group (—CONHSO$_2$R), an acylcarbamoyl group (—CONHCOR), an acylsulfamoyl group (—SO$_2$NHCOR) or a sulfonylsulfamoyl group (—SO$_2$NHSO$_2$R)), a hydroxyaryl group (—ArOH), and a mercaptoaryl group (—ArSH).

In the above formulae, R represents an alkyl group, an aryl group, a heterocyclic group, an alkoxy group, an aryloxy group, a heterocyclyloxy group or an amino group. Specifically, the groups recited below are suitable as R.

Examples of groups suitable as R include 1–18C, preferably 1–10C, far preferably 1–5C, unsubstituted alkyl groups (such as methyl, ethyl, propyl and butyl groups), 1–18C, preferably 1–10C, far preferably 1–5C, substituted alkyl groups (such as hydroxymethyl, trifluoromethyl, benzyl, carboxyethyl, ethoxycarbonylmethyl and acetylaminomethyl groups, and herein the term "substituted alkyl group" is intended to include 2–18C, preferably 3–10C, far preferably 3–5C, unsaturated hydrocarbon groups (e.g., vinyl, ethynyl, 1-cyclohexenyl, benzylidyne, benzylidene)), 6–20C, preferably 6–15C, far preferably 6–10C, substituted or unsubstituted aryl groups (such as phenyl, naphthyl, p-carboxyphenyl, p-nitrophenyl, 3,5-dichlorophenyl, p-cyanophenyl, m-fluorophenyl and p-tolyl groups), 1–20C, preferably 2–10C, far preferably 4–6C, heterocyclic groups which may be substituted (such as pyridyl, 5-methylpyridyl, thienyl, furyl, morpholino and tetrahydrofurfuryl groups), 1–10C, preferably 1–8C, alkoxy groups (such as methoxy, ethoxy, 2-methoxyethoxy, 2-hydroxyethoxy and 2-phenylethoxy groups), 6–20C, preferably 6–12C, far preferably 6–12C, aryloxy groups (such as phenoxy, p-methylphenoxy, p-chlorophenoxy and naphthoxy groups), 1–20C, preferably 3–12C, far preferably 3–10C, heterocyclyloxy groups (which signify oxy groups substituted with heterocyclic groups, such as 2-thienyloxy and 2-morpholinoxy groups), and 0–20C, preferably 0–12C, far preferably 0–8C, amino groups (such as amino, methylamino, dimethylamino, ethylamino, diethylamino, hydroxyethylamino, benzylamino, anilino, diphenylamino and cyclic amino (e.g., morpholino, pyrrolidino) groups). These groups may further be substituted with V radicals mentioned hereinafter.

Of those groups, methyl, ethyl and hydroxyethyl groups, especially methyl group, are preferred over the others.

Ar in the above formulae represents an arylene group, with suitable examples including o-phenylene, m-phenylene, p-phenylene, 4,4'-biphenylene, 1,2-naphthylene, 1,4-naphthylene and 1,8-naphthylene groups. Of these groups, the groups preferred as Ar are o-phenylene, m-phenylene and p-phenylene, especially p-phenylene.

Additionally, the dissociable groups contained in the foregoing formulae are expressed in undissociated forms (e.g., NH, COOH), but they may be expressed in dissociated forms (e.g., $N^-$, $COO^-$).

When a cation is present as a counter ion, such a group is expressed as, e.g., ($N^-$, $Na^+$) in a dissociated form. In the undissociated form, on the other hand, that group is expressed as (NH). Suppose the cationic compound as a counter ion is proton, that group can be expressed as ($N^-$, $H^+$).

Actually, whether such groups are in a dissociated state or in an undissociated state depends on the circumstances surrounding dyes, e.g., pH.

In formula (I), A is a linkage group (preferably a divalent linkage group). It is appropriate that the linkage group include an atom or atoms containing at least one atom selected from among carbon, nitrogen, sulfur and oxygen atoms. Suitable examples of such a linkage group include 0–100C, preferably 1–20C, linkage groups which each have at least one group or a combination of two or more of groups selected from alkylene groups (such as methylene, ethylene, ethylidene, propylene, trimethylene, butylene, tetramethylene and pentylene groups), arylene groups (such as phenylene and naphthylene groups), alkenylene groups (such as ethenylene and propenylene groups), alkynylene groups (such as an ethynylene group, and a propynylene group which may take a branched form), an amido group, an ester group, a sulfonamido group, a sulfonate group, an ureido group, a sulfonyl group, a sulfinyl group, a thioether group, an ether group, a carbonyl group, —N($V_a$)— (wherein $V_a$ represents a hydrogen atom or a monovalent substituent with examples including radicals recited hereinafter) and divalent heterocyclic groups (such as 6-chloro-1,3,5-triazine-2,4-diyl, pyrimidine-2,4-diyl and quinoxaline-2,3-diyl groups).

The linkage groups recited above may further have substituents represented by V hereinafter, or may contain rings (including aromatic rings, nonaromatic hydrocarbon rings, and heterocyclic rings), or may have branched structures.

The linkage group far preferred as A is a 1–10C divalent linkage group made up of one or more groups selected from among 1–10C alkylene groups (e.g., methylene, ethylene, propylene, butylene), 6–10C arylene groups (e.g., phenylene, naphthylene), 2–10C alkenylene groups (e.g., ethenylene, propenylene), 2–10C alkynylene groups (e.g., ethynylene, propynylene), an ether group, an amido group, an ester group, a sulfonamido group and an sulfonate group. These groups may be substituted with V radicals mentioned hereinafter.

Examples of a dissociable group-containing substituent $(A)_rQ$ the Dye moiety has in formula (I) include carboxyalkyl groups (such as carboxymethyl, 2-carboxyethyl, 3-carboxypropyl and 4-carboxybutyl groups), sulfoalkyl groups (such as 2-sulfoethyl, 3-sulfopropyl, 3-sulfobutyl, 4-sulfobutyl, 2-(3-sulfopropoxy)ethyl, 2-hydroxy-3-sulfopropyl and 3-sulfopropoxyethoxyethyl groups), sulfoalkenyl groups, sulfatoalkyl groups (such as 2-sulfatoethyl, 3-sulfatopropyl and 4-sulfatobutyl groups), alkylsulfonylcarbamoylalkyl groups (such as a methanesulfonylcarbamoylmethyl group), acylcarbamoylalkyl groups (such as an acetylcarbamoylmethyl group), acylsulfamoylalkyl groups (such as an acetylsulfamoylmethyl group) and alkylsulfonylsulfamoylalkyl groups (such as a methanesulfonylsulfamoylmethyl group).

q in formula (I) represents the number of dissociable group-containing substituents represented by $(A)_rQ$, specifically an integer of at least 1 (preferably 2 to 4) When the number is 2 or above, those substituents may be the same as or different from each other.

With respect to the substitution site of a dissociable group Q, the dissociable group may be attached directly to the dye moiety as in the case of r=0 or indirectly to the dye moiety via a side chain as in the case of r=1. However, it is preferable that Q is situated on a side chain, especially on a substituent attached to the N-position of a basic nucleus.

Each sensitizing dye used in the invention has at least one —COOH, —CONHSO$_2$R, —CONHCOR, —SO$_2$NHCOR or —SO$_2$NHSO$_2$R, preferably —COOH or —CONHSO$_2$R. And it is particularly advantageous for the sensitizing dye to contain at least one —SO$_3$H and at least one —COOH or —CONHSO$_2$R.

Any of the dyes recited above may be used for the dye moiety represented by Dye in formula (I).

Examples of a dye usable for the dye moiety include cyanine dyes, styryl dyes, hemicyanine dyes, merocyanine dyes, trinuclear merocyanine dyes, tetranuclear merocyanine dyes, rhodacyanine dyes, complex cyanine dyes, complex merocyanine dyes, allopolar dyes, oxonol dyes, hemioxonol dyes, squalium dyes, croconium dyes, azamethine dyes, coumarin dyes, arylidene dyes, anthraquinone dyes, triphenylmethane dyes, azo dyes, azomethine dyes, spiro compounds, metallocene dyes, fluorenone dyes, flugide dyes, perylene dyes, phenazine dyes, phenothiazine dyes, quinone dyes, indigo dyes, diphenylmethane dyes, polyene dyes, acridine dyes, acridinone dyes, diphenylamine dyes, quinacridone dyes, phenoxazine dyes, phthaloperylene dyes, porphyrin dyes, chlorophyll dyes, phthalocyanine dyes and metal complex dyes.

Dyes suitable for the dye moiety Dye are polymethine chromophores, such as cyanine dyes, styryl dyes, hemicyanine dyes, merocyanine dyes, trinuclear merocyanine dyes (whose basic skeletons are preferably those represented by formulae (I) and (II) in JP-A-3-171135 and those represented by formula (I) in JP-A-7-159920), tetranuclear merocyanine dyes, rhodacyanine dyes, complex cyanine dyes, complex merocyanine dyes, allopolar dyes, oxonol dyes, hemioxonol dyes, squalium dyes, croconium dyes, azamethine dyes, coumarin dyes, arylidene dyes, anthraquinone dyes, triphenylmethane dyes, azo dyes and azomethine dyes. Of these dyes, cyanine dyes, merocyanine dyes, trinuclear merocyanine dyes, tetranuclear merocyanine dyes and rhodacyanine dyes are preferred over the others. In particular, cyanine dyes and merocyanine dyes are used to advantage, and cyanine dyes are preferable to merocyanine dyes.

Details on these dyes are described, e.g., in F. M. Hamer, *Heterocyclic Compounds—Cyanine Dyes and Related Compounds*, John Wiley & Sons, New York, London (1964), and D. M. Sturmer, *Heterocyclic Compounds—Special Topics in Heterocyclic Chemistry*, chapter 18, paragraph 14, pages 482–515.

Examples of general formulae by which the suitable dyes are represented include the formulae disclosed in U.S. Pat. No. 5,994,051, columns 32–36, and the formulae disclosed in U.S. Pat. No. 5,747,236, columns 30–34. As general formulae of cyanine dyes, merocyanine dyes and rhodacyanine dyes, the formulae (XI), (XII) and (XIII) disclosed in U.S. Pat. No. 5,340,694, columns 21–22, are suitable (so far as $n_{12}$, $n_{15}$, $n_{17}$ and $n_{18}$ are not limited to particular numbers but are defined as integers of 0 or above (preferably up to 4)).

The dyes used in the invention are illustrated in further detail.

As to the present dyes described above, cases are preferred that the dyes represented by formula (I) are selected from dyes represented by formula (II) or dyes represented by the following formula (VII) or (VIII):

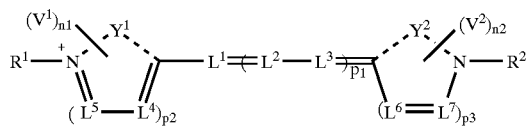

(II)

wherein $R^1$ and $R^2$ each represent a substituted or unsubstituted alkyl, aryl or heterocyclic group, provided that at least either of them is substituted with a dissociable group other than —SO$_3$H; $Y^1$ and $Y^2$ each represent atom group constituting a 5-or 6-membered nitrogen-containing heterocyclic ring which may be condensed with a carbon ring or another heterocyclic ring; $V^1$ and $V^2$ represent substituents attached to the nitrogen-containing heterocyclic rings completed by $Y^1$ and $Y^2$, respectively, or to the carbon ring or the heterocyclic ring fusing with the nitrogen-containing heterocyclic ring; $n^1$ and $n^2$ each represent an integer of 0 or above (preferably an integer up to 4, far preferably 0 or 1), wherein when $n^1$ and $n^2$ are each 2 or above the substituents represented by the corresponding $V^1$s and $V^2$s each may be the same or different; $L^1$, $L^2$, $L^3$, $L^4$, $L^5$, $L^6$ and $L^7$ each represent a methine group; and $p^1$ represents 0, 1, 2 or 3, and $p^2$ and $p^3$ each represent 0 or 1, wherein when $p^1$ is 2 or 3 the repeated ($L^2$–$L^3$) S may be the same as or different from each other;

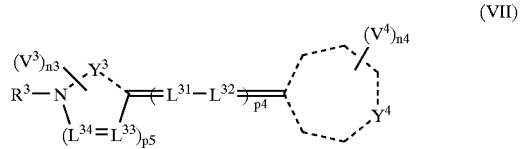

(VII)

wherein $R^3$ represents an alkyl, aryl or heterocyclic group substituted with a dissociable group other than —SO$_3$H; $Y^3$ represents atom group constituting a 5- or 6-membered nitrogen-containing heterocyclic ring which may be condensed with a carbon ring or another heterocyclic ring; $Y^4$ represents atoms forming an acidic nucleus which may be condensed with a carbon ring or the other heterocyclic ring; $V^3$ and $V^4$ each represent a substituent; $n^3$ and $n^4$ each represent an integer of 0 or above (preferably an integer up to 4), wherein when $n^3$ and $n^4$ are each 2 or above the substituents represented by the corresponding $V^3$s and $V^4$s each may be the same or different; $L^{31}$, $L^{32}$, $L^{33}$ and $L^{34}$ each represent a methine group; and $p^4$ represents 0, 1, 2 or 3, and $p^5$ represents 0 or 1, wherein when $p^4$ is 2 or 3 the repeated ($L^{31}$–$L^{32}$)s may be the same as or different from each other;

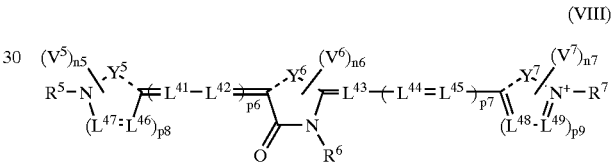

(VIII)

wherein $R^5$, $R^6$ and $R^7$ each represent a substituted or unsubstituted alkyl, aryl or heterocyclic group, provided that at least one of them is substituted with a dissociable group other than —SO$_3$H; $Y^5$, $Y^6$ and $Y^7$ each represent atom group constituting a 5- or 6-membered nitrogen-containing heterocyclic ring which may be condensed with a carbon ring or another heterocyclic ring; $V^5$, $V^6$ and $V^7$ each represent a substituent; $n^5$, $n^6$ and $n^7$ each represent an integer of 0 or above (preferably an integer up to 4), wherein when $n^5$, $n^6$ and $n^7$ are each 2 or above the substituents represented by the corresponding $V^5$s, $V^6$s and $V^7$s each maybe the same or different; $L^{41}$, $L^{42}$, $L^{43}$, $L^{44}$, $L^{45}$, $L^{46}$, $L^{47}$, $L^{48}$ and $L^{49}$ each represent a methine group; and $p^6$ and $p^7$ each represent 0, 1, 2 or 3, and $p^8$ and $p^9$ each represent 0 or 1, wherein when $p^6$ and $p^7$ are each 2 or 3 the repeated $L^{41}$s, $L^{42}$s, $L^{44}$s and $L^{45}$s individually may be the same as or different from each other.

In formulae (II), (VII) and (VIII), $Y^1$, $Y^2$, $Y^3$, $Y^5$ and $Y^7$ are each atom group constituting a 5- or 6-membered nitrogen-containing heterocyclic ring which may be condensed with a carbon ring or a heterocyclic ring. The ring fusing with the nitrogen-containing heterocyclic ring, though it may be either aromatic or non-aromatic ring, is preferably an aromatic ring including aromatic hydrocarbon rings, such as a benzene ring and a naphthalene ring, and aromatic heterocyclic rings, such as a pyrazine ring and a thiophene ring.

Examples of the 5- or 6-membered nitrogen-containing heterocyclic ring include a thiazoline nucleus, a thiazole nucleus, a benzothiazole nucleus, a thieno[2,3-d]thiazole nucleus, a thieno[3,2-d]thiazole nucleus, an oxazoline nucleus, an oxazole nucleus, a benzoxazole nucleus, a selenazoline nucleus, a selenazole nucleus, a benzoselenazole nucleus, an indolenine nucleus the 3-position of which is substituted with two groups (such as alkyl or aryl groups, preferably alkyl groups), such as 3,3-dimethylindolenine, an imidazoline nucleus, an imidazole nucleus, a benzimidazole nucleus, a 2-pyridine nucleus, a 4-pyridine nucleus, a 4-quinoline nucleus, a 1-isoquinoline nucleus, a 3-isoquinoline nucleus, an imidazo[4,5-b]quinoxazline nucleus, an oxadiazole nucleus, a thiadiazole nucleus, a tetrazole nucleus, and a pyrimidine nucleus. Of these nuclei, benzothiazole, benzoxazole, 3,3-dialkylindolenine (e.g., 3,3-dimethylindolenine), benzimidazole, 2-pyridine, 4-pyridine, 2-quinoline, 4-quinoline, 1-isoquinoline and 3-isoquinoline nuclei are preferred over the others. Among these preferred nuclei the nuclei preferable by far are benzothiazole, thieno[2,3-d]thiazole, thieno[3,2-d]thiazole, benzoxazole, 3,3-dialkylindolenine (e.g., 3,3-dialkylindolenine) and benzimidazole nuclei. In particular, benzoxazole, benzothiazole, thieno[2,3-d]thiazole, thieno[3,2-d]thiazole and benzimidazole nuclei are favorable, benzoxazole, benzothiazole, thieno[2,3-d]thiazole and thieno[3,2-d]thiazole nuclei are more favorable, and benzoxazole, benzothiazole and thieno[2,3-d]thiazole nuclei are most favorable.

In formula (VII), $Y^4$ represents atom group forming an acyclic or cyclic acidic nucleus, but it may take any of the acidic nucleus forms general merocyanine dyes have. In a preferred form, $Y^4$ has a thiocarbonyl or carbonyl group at a position adjacent to the methine chain-attached position.

The term "acidic nucleus" as used herein is defined as in T. H. James, *THE THEORY OF THE PHOTOGRAPHIC PROCESS*, 4th ed., p. 198, MacMillan Publishing Co., Inc. (1977). Examples of such an acidic nucleus include those disclosed in U.S. Pat. Nos. 3,567,719, 3,575,869, 3,804,634, 3,837,862, 4,002,480 and 4,925,777, and JP-A-3-167546.

It is preferable that the acidic nucleus forms a 5- or 6-membered nitrogen-containing heterocyclic ring made up of carbon, nitrogen and chalcogen atoms (typically including oxygen, sulfur, selenium and tellurium atoms).

Examples of such a nitrogen-containing heterocyclic ring include the nuclei of 2-pyrazoline-5-one, pyrazolidine-3,5-dione, imidazoline-5-one, hydantoin, 2- or 4-thiohydantoin, 2-iminoxazolidine-4-one, 2-oxazoline-5-one, 2-thioxazoline2,4-dione, isoxazoline-5-one, 2-thiazoline-4-one, thiazolidine-4-one, thiazolidine-2,4-dione, rhodanine, thiazolidine-2,4-dithione, isorhodanine, indane-1,3-dione, thiophene-3-one, thiophene-3-one-1,1-dioxide, indoline-2-one, indoline-3-one, 2-oxoindazolinium, 2-oxoindazolinium, 5,7-dioxo-6,7-dihydrothiazolo[3,2-a]pyrimidine, cyclohexane-1,3-dione, 3,4-dihydroisoqluinoline-4-one, 1,3-dioxane-4,6-dione, barbituric acid, 2-thiobarbituric acid, chroman-2,4-dione, indazoline-2-one, pyrido[1,2-a]pyrimidine-1,3-dione, pyrazolo[1,5-b]quinazolone, pyrazolo[1,5-a]benzimidazole, pyrazopyridone, 1,2,3,4-tetahydroquinone-2,4-dione, 3-oxo-2,3-dihydrobenzo[d]thiophene-1,1-dioxide, 3-dicyanomethylene-2,3-dihydrobenzo[d]thiophene-1,1-dioxid e, and the nuclei having exomethylene structures formed by replacing the carbonyl or thiocarbonyl groups of the nuclei recited above by the active methylene sites of active methylene compounds having ketomethylene or cyanomethylene structures.

Examples of an acidic nucleus suitable as $Y^4$ include hydantoin, 2- or 4-thiohydantoin, 2-oxazoline-5-one, 2-thioxazoline-2,4-dione, thiazolidine-2,4-dione, rhodanine, thiazolidine-2,4-dithione, barbituric acid and 2-thiobarbituric acid, those more suitable as $Y^4$ are hydantoin, 2- or 4-thiohydantoin, 2-oxazoline-5-one, rhodanine, barbituric acid and 2-thiobarbituric acid, and those particularly suitable as $Y^4$ are 2- or 4-thiohydantoin, 2-oxazoline-5-one, rhodanine and barbituric acid.

In formula (VIII), the 5- or 6-membered nitrogen-containing heterocyclic ring completed by $Y^6$ is equivalent to the heterocyclic ring represented by $Y^4$, except that neither oxo nor thioxo group is attached thereto. The heterocyclic ring suitable for $Y^6$ includes the remainders after removal of oxo or thioxo groups from hydantoin, 2- or 4-thiohydantoin, 2-oxazoline-5-one, 2-thioxazoline-2,4-dione, thiazolidine-2,4-dione, rhodanine, thiazolidine-2,4-dithione, barbituric acid and 2-thiobarbituric acid. Of these rings, the remainders after removal of oxo or thioxo groups from hydantoin, 2- or 4-thiohydantoin, 2-oxazoline-5-one, rhodanine, barbituric acid and 2-thiobarbituric acid, especially from 2- or 4-thiohydantoin, 2-oxozoline-5-one and rhodanine, are preferred over the others.

In formulae (II), (VII) and (VIII), substituents $V^1$ to $V^7$ (collectively referred to as "V") present individually on the nitrogen-containing heterocyclic rings (including rings condensed therewith) completed by $Y^1$ to $Y^7$ have no particular restrictions, but each of them specifically includes a halogen atom, an alkyl group (including cycloalkyl groups), an alkenyl group (including cycloalkenyl groups), an alkynyl group, an aryl group, a heterocyclic group, a cyano group, a hydroxyl group, a nitro group, a carboxyl group, an alkoxy group, an aryloxy group, a silyloxy group, a heterocyclyloxy group, an acyloxy group, a carbamoyloxy group, an alkoxycarbonyloxy group, an aryloxycarbonyloxy group, an amino group (including alkylamino groups and arylamino groups), an acylamino group, an aminocarbonylamino group, an alkoxycarbonylamino group, an aryloxycarbonylamino group, a sulfamoylamino group, an alkyl- and arylsulfonylamino group, a mercapto group, an alkylthio group, an arylthio group, a heterocyclylthio group, a sulfamoyl group, a sulfamoyl group, a sulfo group, an alkyl- and arylsulfinyl group, an alkyl- and arylsulfonyl group, an acyl group, an aryloxycarbonyl group, an alkoxycarbonyl group, a carbamoyl group, an aryl- and heterocyclylazo group, an imido group, a phosphino group, a phosphinyl group, a phosphinyloxy group, a phosphinylamino group and a silyl group.

More specifically, V includes a halogen atom (e.g., chlorine, bromine, iodine), an alkyl group [which represents substituted or unsubstituted linear, branched and cyclic alkyl groups, specifically including substituted or unsubstituted alkyl groups (preferably 1–30C substituted or unsubstituted alkyl groups, such as methyl, ethyl, n-propyl, isopropyl, t-butyl, n-octyl, eicosyl, 2-chloroethyl, 2-cyanoethyl and 2-ethylhexyl), cycloalkyl groups (preferably 5–30C substituted or unsubstituted cycloalkyl groups, such as cyclohexyl, cyclopentyl and 4-n-dodecylcyclohexyl), bicycloalkyl groups (preferably 5–30C substituted or unsubstituted bicycloalkyl groups, such as bicyclo[1.2.2]heptane-2-yl and bicyclo[2.2.2]octane-3-yl), and alkyl groups having tricyclo structures or structures greater in number of cycles (Making an additional remark, the alkyl moieties of substituents recited below (e.g., the alkyl moiety of an alkylthio group) are intended to include not only the alkyl groups having the concept mentioned above but also alkenyl groups, cycloalkenyl groups, bicycloalkenyl groups and alkynyl groups recited below], an alkenyl group [which represents substituted or unsubstituted linear, branched and cyclic alkenyl groups, specifically including alkenyl groups (preferably 2–30C substituted or unsubstituted alkenyl groups, such as vinyl, allyl, prenyl, geranyl and oleyl), cycloalkenyl groups (preferably 3–30C substituted or unsubstituted cycloalkenyl groups, such as 2-cyclopentene-1-yl and 2-cyclohexene-1-yl), bicycloalkenyl groups (including substituted and unsubstituted bicycloalkenyl groups, preferably 5–30C substituted and unsubstituted bicycloalkenyl groups, such as bicyclo[2.2.1]hepto-2-ene-1-yl and bicyclo[2.2.2]octo-2-ene-4-yl)], an alkynyl group (preferably including 2–30C substituted or unsubstituted alkynyl groups, such as ethynyl, propargyl and trimethylsilylethynyl), an aryl group (preferably including 6–30C substituted and unsubstituted aryl groups, such as phenyl, p-tolyl, naphthyl, m-chlorophenyl and o-hexadecanoylaminophenyl), a heterocyclic group (preferably a monovalent group formed by removing a hydrogen atom from a 5- or 6-membered, substituted or unsubstituted, aromatic or non-aromatic heterocyclic compound, far preferably a 3–30C 5- or 6-membered aromatic heterocyclic group, such as 2-furyl, 2-thienyl, 2-pyrimidinyl or 2-benzothiazolyl), a cyano group, a hydroxyl group, a nitro group, a carboxyl group, an alkoxy group (preferably a 1–30C substituted or unsubstituted alkoxy group, such as methoxy, ethoxy, isopropoxy, t-butoxy, n-octyloxy or 2-methoxyethoxy), an aryloxy group (preferably a 6–30C substituted or unsubstituted aryloxy group, such as phenoxy, 2-methylphenoxy, 4-t-butylphenoxy, 3-nitrophenoxyor 2-tetradecanoylaminophenoxy), a silyloxy group (preferably a 3–20C silyloxy group, such as trimethylsilyloxy or t-butyldimethylsilyloxy), a heterocyclyloxy group (preferably a 2–30C substituted or unsubstituted heterocyclyloxy group, such as 1-phenyltetrazole-5-oxy or 2-tetrahydropyranyloxy), an acyloxy group (preferably formyloxy group, a 2–30C substituted or unsubstituted alkylcarbonyloxy group or a 6–30C substituted or unsubstituted arylcarbonyloxy group, such as formyloxy, acetyloxy, pivaroyloxy, stearoyloxy, benzoyloxy or p-methoxyphenylcarbonyloxy), a carbamoyloxy group (preferably a 1–30C substituted or unsubstituted carbamoyloxy group, such as N,N-dimethylcarbamoyloxy, N,N-diethylcarbamoyloxy, morpholinocarbonyloxy, N,N-di-n-octylaminocarbonyloxy or N-n-octylcarbamoyloxy), an alkoxycarbonyloxy group (preferably a 2–30C substituted or unsubstituted alkoxycarbonyloxy group, such as methoxycarbonyloxy, ethoxycarbonyloxy, t-butoxycarbonyloxy or n-octylcarbonyloxy), an aryloxycarbonyloxy group (preferably a 7–30C substituted or unsubstituted aryloxycarbonyloxy group, such as phenoxycarbonyloxy, p-methoxyphenoxycarbonyloxy, p-n-hexadecyloxyphenoxycarbonyloxy), an amino group (preferably an amino group, a 1–30C substituted or unsubstituted alkylamino group or a 6–30C substituted or unsubstituted arylamino group, such as amino, methylamino, dimethylamino, anilino, N-methylanilino or diphenylamino), an acylamino group (preferably a formylamino group, a 1–30C substituted or unsubstituted alkylcarbonylamino group or a 6–30C substituted or unsubstituted arylcarbonylamino group, such as formylamino, acetylamino, pivaroylamino, lauroylamino, benzoylamino or 3,4,5-tri-n-octyloxyphenylcarbonylamino), an aminocarbonyl-amino group (preferably a 1–30C substituted or unsubstituted aminocarbonylamino group, such as carbamoylamino, N,N-dimethylaminocarbonylamino, N,N-diethylaminocarbonylamino or morpholinocarbonylamino), an alkoxycarbonylamino group (preferably a 2–30C substituted or unsubstituted alkoxycarbonylamino group, such as methoxycarbonylamino, ethoxycarbonylamino, t-butoxycarbonylamino, n-octadecyloxycarbonylamino or N-methylmethoxycarbonylamino), an aryloxycarbonylamino group (preferably a 7–30C substituted or unsubstituted aryloxycarbonylamino group, such as phenoxycarbonylamino, p-chlorophenoxycarbonylamino or m-(n-octyloxy)phenoxycarbonylamino), a sulfamoylamino group (preferably a 0–30C substituted or unsubstituted sulfamoylamino group, such as sulfamoylamino, N,N-dimethylaminosulfonylamino or N-n-octylaminosulfonylamino), alkyl- and arylsulfonylamino groups (preferably a 1–30C substituted or unsubstituted alkylsulfonylamino group and a 6–30C substituted or unsubstituted arylsulfonylamino group, such as methylsulfonylamino, butylsulfonylamino, phenylsulfonylamino, 2,3,5-trichlorophenylsulfonylamino and p-methylphenylsulfonylamino), a mercapto group, an alkylthio group (preferably a 1–30C substituted or unsubstituted alkylthio group, such as methylthio, ethylthio or n-hexadecylthio), a heterocyclylthio group (preferably a 2–30C substituted or unsubstituted heterocyclylthio group, such as 2-benzothiazolylthio or 1-phenyltetrazole-5-ylthio), a sulfamoyl group (preferably a 0–30C substituted or unsubstituted sulfamoyl group, such as N-ethylsulfamoyl, N-(3-dodecyloxypropyl)sulfamoyl, N,N-dimethylsulfamoyl, N-acetylsulfamoyl, N-benzoylsulfamoyl or N-(N'-phenylcarbamoyl)sulfamoyl), a sulfo group, alkyl- and arylsulfinyl groups (preferably a 1–30C substituted or unsubstituted alkylsulfinyl group and a 6–30C substituted or unsubstituted arylsulfinyl group, such as methylsulfinyl, ethylsulfinyl, phenylsulfinyl or p-methylphenylsulfinyl), alkyl- and arylsulfonyl groups (preferably a 1–30C substituted or unsubstituted alkylsulfonyl group and a 6–30C substituted or unsubstituted arylsulfonyl group, such as methylsulfonyl, ethylsulfonyl, phenylsulfonyl or p-methylphenylsulfonyl), an acyl group (preferably formyl group, a 2–30C substituted or unsubstituted alkylcarbonyl group, a 7–30C substituted or unsubstituted arylcarbonyl group or a 4–30C substituted or unsubstituted heterocyclic carbonyl group the carbonyl group of which is attached to a carbon atom constituting the heterocyclic ring, such as acetyl, pivaroyl, 2-chloroacetyl, stearoyl, benzoyl, p-n-octyloxyphenylcarbonyl, 2-pyridylcarbonyl or 2-furylcarbonyl), an aryloxycarbonyl group (preferably a 7–30C substituted or unsubstituted aryloxycarbonyl group, such as phenoxycarbonyl, o-chlorophenoxycarbonyl, m-nitrophenoxycarbonyl or p-t-butylphenoxycarbonyl), an alkoxycarbonyl group (preferably a 2–30C substituted or unsubstituted alkoxycarbonyl group, such as methoxycarbonyl, ethoxycarbonyl, t-butoxycarbonyl or n-octadecyloxycarbonyl), a carbamoyl group (preferably a 1–30C substituted or unsubstituted carbamoyl group, such as carbamoyl, N-methylcarbamoyl, N,N-dimethylcarbamoyl, N,N-di-n-octylcarbamoyl, N-(methylsulfonyl)carbamoyl), aryl- and heterocyclylazo groups (preferably a 6–30C substituted or unsubstituted arylazo group and a 3–30C substituted or unsubstituted heterocyclylazo group, such as phenylazo, p-chlorophenylazo and 5-ethylthio-1,3,4-thiadiazole-2-ylazo), an imido group (preferably N-succinimido or N-phthalimido), a phosphino group (preferably a 2–30C substituted or unsubstituted phosphino group, such as dimethylphosphino, diphenylphosphino or methylphenoxyphosphino), a phosphinyl group (preferably a 2–30C substituted or unsubstituted phosphinyl group, such as phosphinyl, dioctyloxyphosphinyl or diethoxyphosphinyl), a phosphinyloxy group (preferably a 2–30C substituted or unsubstituted phosphinyloxy group, such as diphenoxyphosphinyloxy or dioctyloxyphosphinyloxy), a phosphinylamino group (preferably a 2–30C substituted or unsubstituted phosphinylamino group, such as dimethoxyphosphinylamino or dimethylaminophosphinylamino), a silyl group (preferably a 3–30C substituted or unsubstituted silyl group, such as trimethylsilyl, t-butyldimethylsilyl or phenyldimethylsilyl), and a group having a dissociable group as represented by the Q though some of the groups recited above are included therein.

In addition, two neighbors of the substituents Vs may combine with each other to complete a condensed ring. The ring condensed may be a carbon ring such as a benzene ring, a cyclohexene ring or a naphthalene ring, or a heterocyclic ring such as a pyrazine ring or a thiophene ring. However, it is preferable that such a condensed ring is not present.

The substituent preferred as V is the alkyl, aryl, alkoxy or halogen as recited above.

In formula (VII), an alkyl group, an aryl group or a heterocyclic group attached to a nitrogen atom contained in the acidic nucleus represented by $Y^4$ is symbolized by $R^4$. In addition to $R^4$, each of $R^1$, $R^2$, $R^3$, $R^5$, $R^6$ and $R^7$ in formulae (II), (VII) and (VIII) is also an alkyl group, an aryl group or a heterocyclic group. Examples of such groups include 1–18C, preferably 1–7C, particularly preferably 1–4C, unsubstituted alkyl groups (such as methyl, ethyl, propyl, isopropyl, butyl, isobutyl, hexyl, octyl, dodecyl and octadecyl), 1–18C, preferably 1–7C, particularly preferably 1–4C, substituted alkyl groups {such as alkyl groups substituted with the Vs as recited above, preferably including aralkyl groups (e.g., benzyl, 2-phenylethyl), unsaturated hydrocarbon groups (e.g., allyl), hydroxyalkyl groups (e.g., 2-hydroxyethyl, 3-hydroxypropyl), carboxyalkyl groups (e.g., 2-carboxyethyl, 3-carboxypropyl, 4-carboxybutyl, carboxymethyl), alkoxyalkyl groups (e.g., 2-methoxyethyl, 2-(2-methoxyethoxy)ethyl), aryloxyalkyl groups (e.g., 2-phenoxyethyl, 2-(1-naphthoxy)ethyl), alkoxycarbonylalkyl groups (e.g., ethoxycarbonylmethyl, 2-benzyloxycarbonylethyl), aryloxycarbonylalkyl groups (e.g., 3-phenoxycarbonylpropyl), acyloxyalkyl groups (e.g., 2-acetyloxyethyl), acylalkyl groups (e.g., 2-acetylethyl), carbamoylalkyl groups (e.g., 2-morpholinocarbonylethyl), sulfamoylalkyl groups (e.g., N,N-dimethylsulfamoylmethyl), sulfoalkyl groups (e.g., 2-sulfoethyl, 3-sulfopropyl, 3-sulfobutyl, 4-sulfobutyl, 2-(3-sulfopropoxy)ethyl, 2-hydroxy-3-sulfopropyl, 3-sulfopropoxyethoxyethyl), sulfoalkenyl groups, sulfatoalkyl groups (e.g., 2-sulfatoethyl, 3-sulfatopropyl, 4-sulfatobutyl), heterocycle-substituted alkyl groups (e.g., 2-(pyrrolidine-2-one-1-yl)ethyl, tetrahydrofurfuryl), alkylsulfonylcarbamoylalkyl groups (e.g., methanesulfonylcarbamoylmethyl), acylcarbamoylalkyl groups (e.g., acetylcarbamoylmethyl), acylsulfamoylalkyl groups (e.g., acetylsulfamoylmethyl) and alkylsulfonylsulfamoyl-alkyl groups (e.g., methanesulfonylsulfamoylmethyl)}, 6–20C, preferably 6–10C, far preferably 6–8C, aryl groups which may have substituents as recited for the V (e.g., phenyl, 1-naphthyl, p-methoxyphenyl, p-methylphenyl, p-chlorophenyl), 1–20C, preferably 3–10C, far preferably 4–8C, heterocyclic groups which may have substitutents as recited for the V (e.g., 2-furyl, 2-thienyl, 2-pyridyl, 3-pyrazolyl, 3-isooxazolyl, 3-isothiazolyl, 2-imidazolyl, 2-oxazolyl, 2-thiazolyl, 2-pyridazinyl, 2-pyrimidyl, 3-pyrazinyl, 2-(1,3, 5-triazolyl), 3-(1,2,4-triazolyl), 5-tetrazolyl, 5-methyl-2-thienyl, 4-methoxy-2-pyridyl), and groups having dissociable groups as represented by the Q though some of the groups recited above are included therein.

In formulae (II), (VII) and (VIII), $L^1$, $L^2$, $L^3$, $L^4$, $L^5$, $L^6$, $L^7$, $L^{31}$, $L^{32}$, $L^{33}$, $L^{34}$, $L^{41}$, $L^{42}$, $L^{43}$, $L^{44}$, $L^{45}$, $L^{46}$, $L^{47}$, $L^{48}$ and $L^{49}$ each represent a methine group independently. Each methine group may have a substituent as recited for the V. Examples of such a substituent include substituted or unsubstituted 1–15C, preferably 1–10C, particularly preferably 1–5C, alkyl groups (e.g., methyl, ethyl, 2-carboxyethyl), substituted or unsubstituted 6–20C, preferably 6–15C, far preferably 6–10C, aryl groups (e.g., phenyl, o-carboxyphenyl), substituted or unsubstituted 3–20C, preferably 4–15C, far preferably 6–10C, heterocyclic groups (e.g., N,N-dimethylbarbituric acid), halogen atoms (e.g., fluorine, chlorine, bromine, iodine), 1–15C, preferably 1–10C, far preferably 1–5C, alkoxy groups (e.g., methoxy, ethoxy), 0–15C, preferably 2–10C, far preferably 4–10C, amino groups (e.g., methylamino, N,N-dimethylamino, N-methyl-N-phenylamino, N-methylpiperazino), 1–15C, preferably 1–10C, far preferably 1–5C, alkylthio groups (e.g., methylthio, ethylthio), and 6–20C, preferably 6–12C, far preferably 6–10C, arylthio groups (e.g., phenylthio, p-methylphenylthio). Each methine group, together with another methine group, may form a ring, or each methine group, together with its neighboring group selected from among $Y^1$ to $Y^7$, $R^1$ to $R^7$ or $V^1$ to $V^7$, can form a ring, too.

$L^1$ is preferably an unsubstituted methine group. When $p^1$ is 1, it is preferable that $L^2$ is a methine group substituted with an unsubstituted alkyl group and $L^3$ is an unsubstituted methine group. In particular, the methine group substituted with a methyl or ethyl group is suitable as $L^2$.

Each of $L^4$, $L^5$, $L^6$, $L^7$, $L^{33}$, $L^{34}$, $L^{46}$, $L^{47}$ and $L^{48}$ is preferably an unsubstituted methine group.

$p^1$, $p^4$, $p^6$ and $p^7$ each represent 0, 1, 2 or 3 independently. Each of them is preferably 0, 1 or 2, far preferably 0 or 1. When $p^1$, $p^4$, $p^6$ and $p^7$ are each 2 or 3, a methine group is repeated, but the repeated methine groups needn't be the same as each other.

$p^2$, $p^3$, $p^5$, $p^8$ and $p^9$ each represent 0 or 1 independently. Each of them is preferably 0.

Of the present dyes illustrated above, the dyes represented by formula (II) are most suitable. In these cases, suitable examples of a 5- or 6-membered nitrogen-containing heterocyclic ring represented by $Y^1$ and $Y^2$ each include a benzothiazole nucleus, a thieno[2,3-d]thiazole nucleus, a thieno[3,2-d]thiazole nucleus, a benzoxazole nucleus, a 3,3-dialkylindolenine nucleus (e.g., 3,3-dimethylindolenine) and a benzimidazole nucleus. Of these nuclei, the benzoxazole, benzothiazole, thieno[2,3-d]thiazole, thieno[3, 2-d]thiazole and benzimidazole nuclei are preferable, and the benzoxazole, benzothiazole and thieno[2,3-d]thiazole nuclei are preferred by far. The present method for preparation of dye solutions can be used to particular advantage in the cases where the dyes are represented by formula (II), and besides, one of the nitrogen-containing heterocyclic rings contained in each dye is a benzoxazole or benzothiazole nucleus and the other is a thieno[2,3-d]thiazole or thieno[3,2-d]thiazole nucleus.

Examples of dyes usable in the invention are illustrated below, but these examples should not be construed as limiting the scope of the invention in any way.

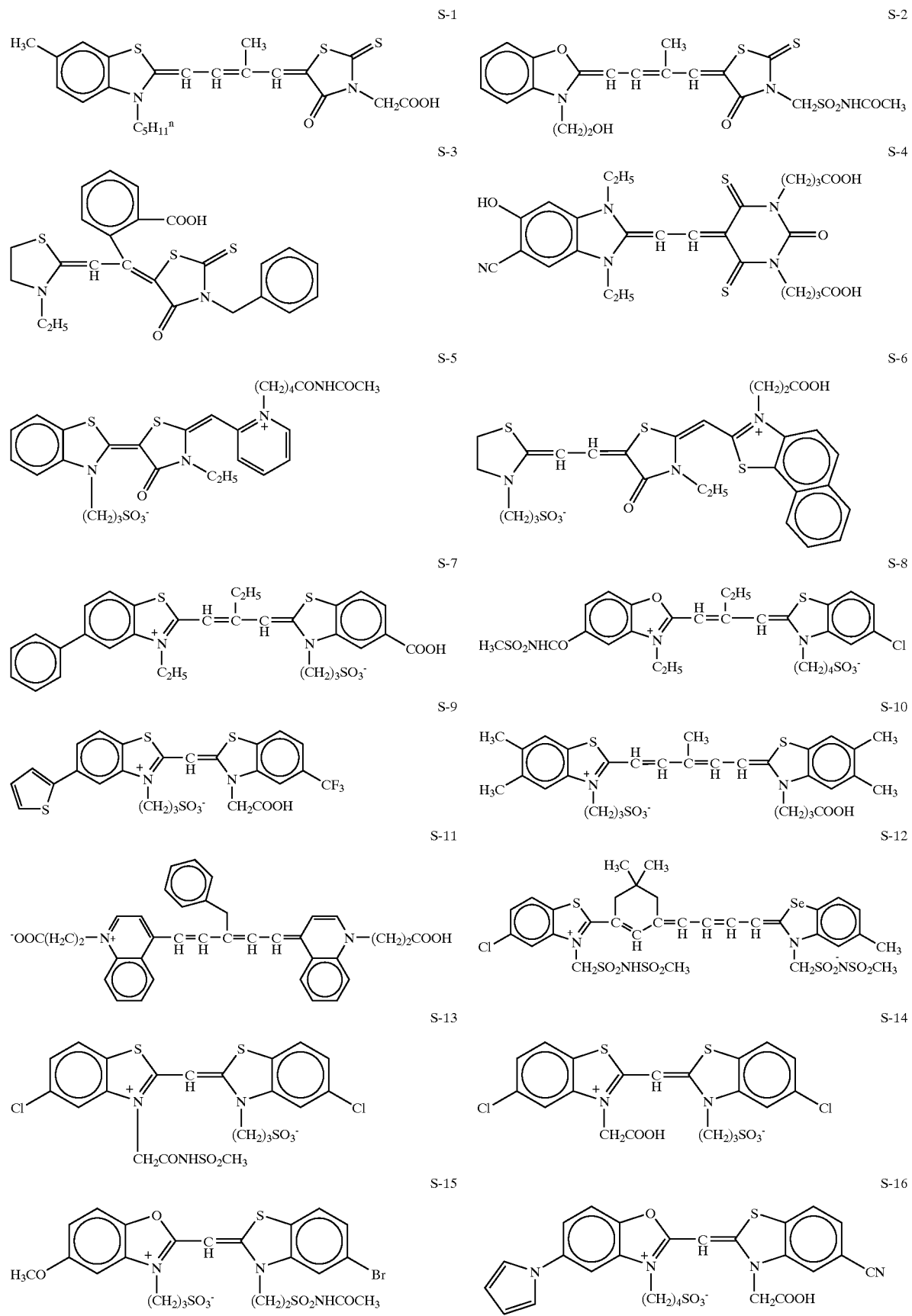

-continued
S-17
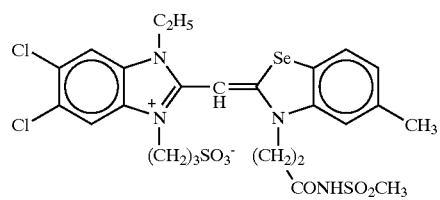
S-18
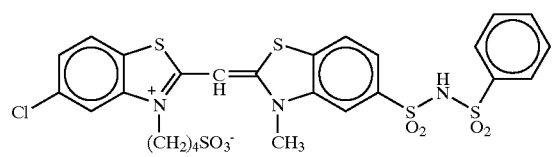
S-19
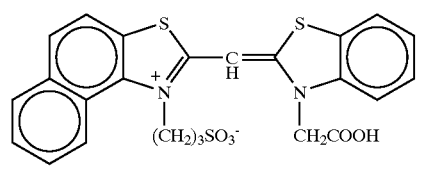
S-20
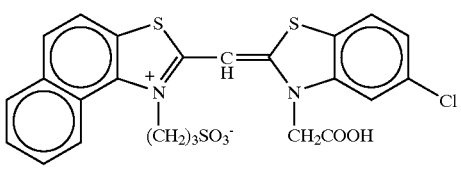
S-21
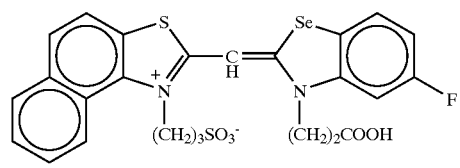
S-22
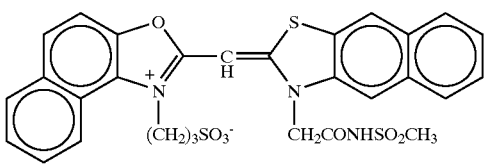
S-23
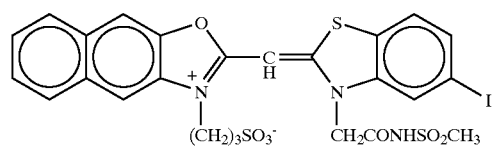
S-24
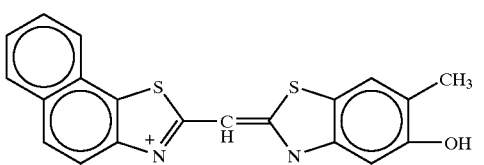
S-25
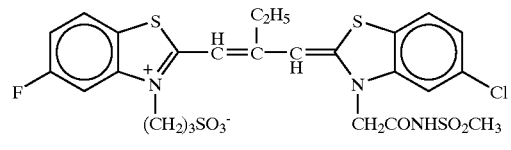
S-26
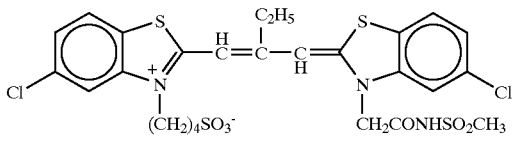
S-27
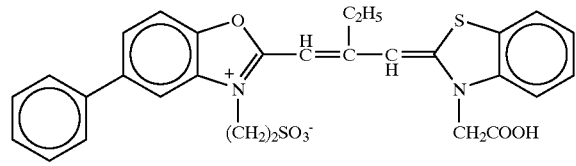
S-28
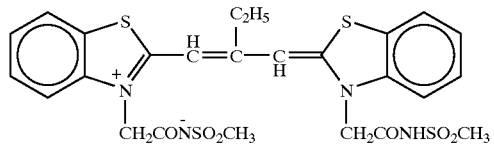
S-29
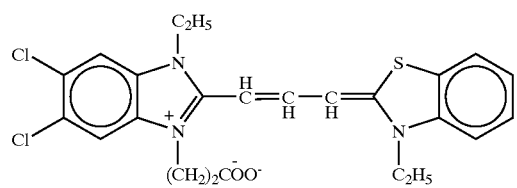
S-30
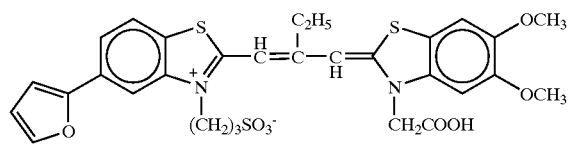
S-31
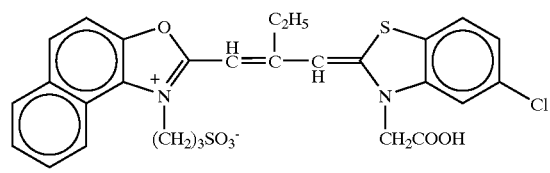
S-32
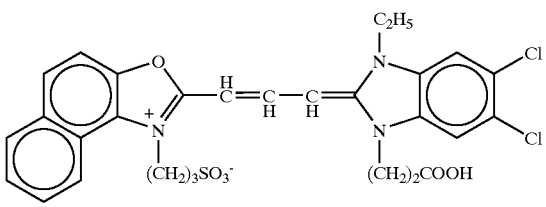

-continued
S-33
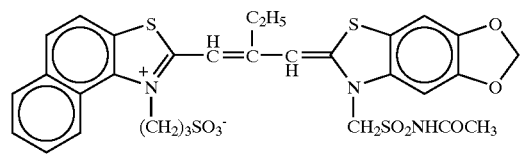
S-34
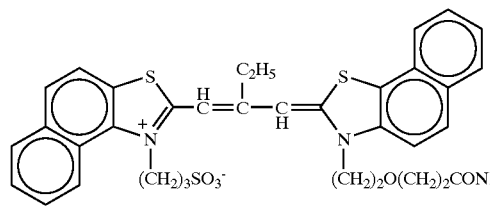
S-35
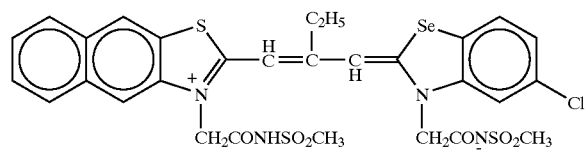
S-36
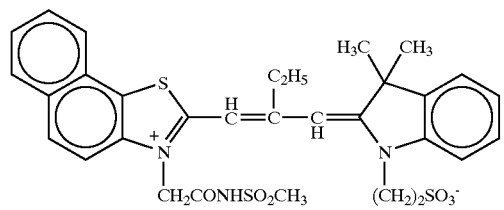
S-37
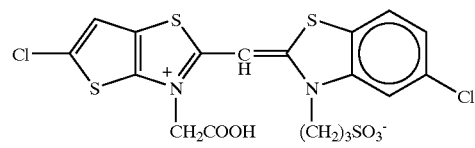
S-38
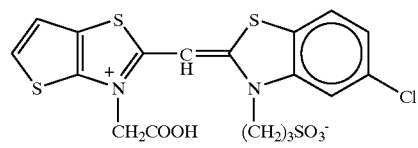
S-39
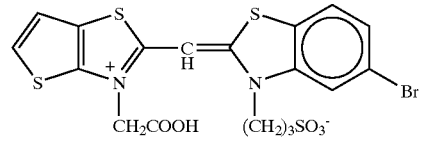
S-40
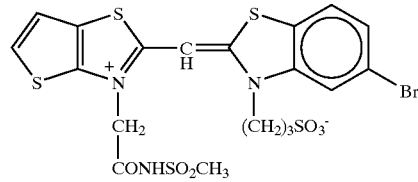
S-41
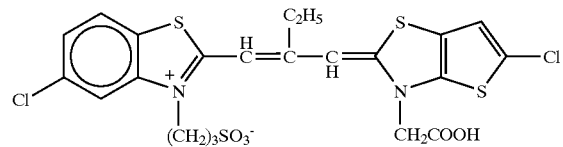
S-42
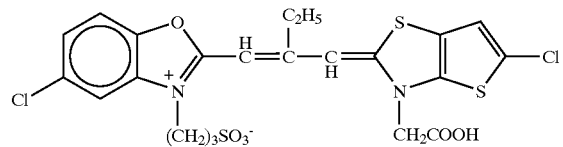
S-43
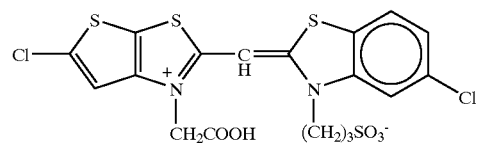
S-44
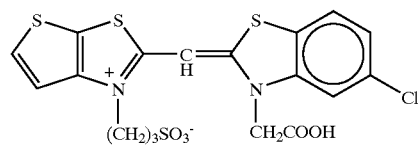
S-45
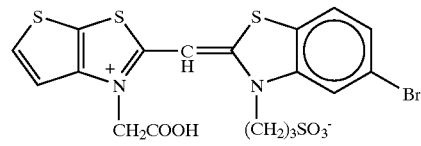
S-46
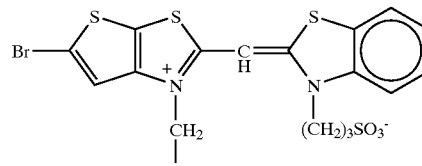
S-47
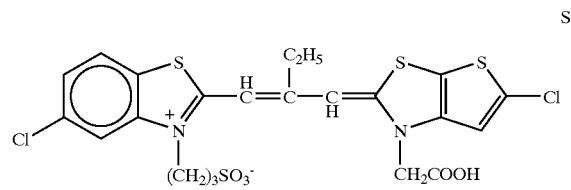
S-48
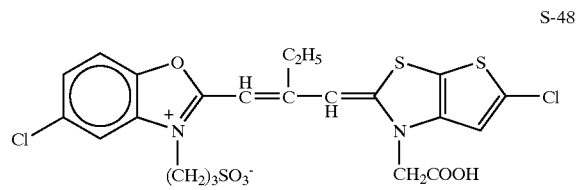

The dyes represented by the present formula (I) (including dyes having narrower definitions) can be synthesized in accordance with the methods described, e.g., in F. M. Hamer, *Heterocyclic Compounds—Cyanine Dyes and Related Compounds*, John Wiley & Sons, New York, London (1964); D. M. Sturmer, *Heterocyclic Compounds—Special Topics in Heterocyclic Chemistry*, chapter 18, paragraph 14, pages 482–515, John Wiley & Sons, New York, London (1977); and *Rodd's Chemistry of Carbon Compounds*, 2nd edition, volume IV, part B, chapter. 15, pages 369–422, Elsevier Science Publishing Company Inc, New York (1977).

The relative dielectric constants of solvents used for dissolving the present dyes are at least 10 (and preferably up to 50), preferably at least 20, particularly preferably at least 30, at 20° C. In addition to water (relative dielectric constant: 80.10), examples of solvents whose relative dielectric constants are within such a range are organic solvents including methanol (33.0), ethanol (25.3), n-propanol (20.8), isopropanol (20.18), n-butanol (17.51), isobutanol (17.93), t-butanol (12.47), benzyl alcohol (13.1), 2,2,2-trifluoroethanol (27.68), methyl cellosolve (17.23), acetone (21.01), acetonitrile (36.64), pyridine (13.26), N,N-dimethylformamide (38.25), N,N-dimethylacetamide (38.85), N-methylpyrrolidone (32.55), dimethyl sulfoxide (47.24) and sulfolane (42.13), and mixtures of two or more thereof. Of these solvents, the most suitable ones are water, methanol and a water-methanol mixture.

In dissolving the present dyes in water, organic solvents as recited above, or mixtures thereof, bases having pKa values of from 6.6 to 9.0, preferably from 7.0 to 8.0, are added. When the conjugate acids of such bases cause multistage dissociation, the pKa values are indicated by values at the final dissociation stage.

Examples of bases usable in the invention include compounds represented by the following formulae (III) to (VI):

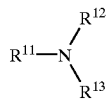
(III)

wherein $R^{11}$, $R^{12}$ and $R^{13}$ each represent a hydrogen atom, or a substituted or unsubstituted alkyl group, provided that at least one of them is an alkyl group substituted with a group having a σm value greater than 0;

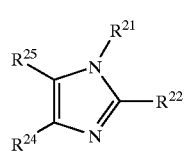
(IV)

wherein $R^{21}$, $R^{22}$, $R^{24}$ and $R^{25}$ each represent a hydrogen atom or a substituent, and $R^{24}$ and $R^{25}$ may combine with each other to form a carbon ring or a heterocyclic ring;

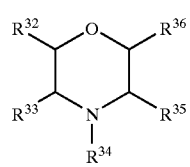
(V)

wherein $R^{32}$, $R^{33}$, $R^{34}$, $R^{35}$ and $R^{36}$ each represent a hydrogen atom or a substituent; and

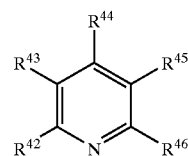
(VI)

wherein $R^{42}$, $R^{43}$, $R^{44}$, $R^{45}$ and $R^{46}$ each represent a hydrogen atom or a substituent, provided that at least two of them are unsubstituted alkyl groups or alkyl groups substituted with groups having σm values of 0 or below, and any adjacent two of them may combine with each other to form a carbon ring or a heterocyclic ring.

In formulae (III) to (IV), the alkyl groups represented by $R^{11}$, $R^{12}$ and $R^{13}$ include the same alkyl groups as recited for examples of R in the description of formula (I), and the substituents represented by $R^{21}$, $R^{22}$, $R^{24}$, $R^{25}$, $R^{32}$, $R^{33}$, $R^{34}$, $R^{35}$, $R^{36}$, $R^{42}$, $R^{43}$, $R^{44}$, $R^{45}$ and $R^{46}$ include the same substituents as recited for examples of the V. When two of the foregoing substituents combine with each other to form a condensed ring, the ring condensed includes a carbon ring such as a benzene ring, a cyclohexene ring or a naphthalene ring, and a heterocyclic ring such as a pyrazine ring or a thiophene ring.

At least one $R^{11}$, $R^{12}$ and $R^{13}$ in formula (III) is an alkyl group substituted with a group having a σm value greater than 0 (and preferably 0.8 or below), and at least two of $R^{42}$, $R^{43}$, $R^{44}$, $R^{45}$ and $R^{46}$ in formula (VI) are unsubstituted alkyl groups or alkyl groups substituted with groups having σm values of 0 or below (and preferably −0.2 or above). The groups having σm values in the foregoing ranges can be selected appropriately from TABLE I shown in *Chemical Reviews*, vol. 91, p. 165 (1991).

Examples of a group having a σm value greater than 0 include OH(0.12), OCH$_3$(0.12), F(0.48), Cl(0.37), Br(0.39), I(0.35), CF$_3$(0.43), COOH(0.38), COCH$_3$(0.38), COCF$_3$ (0.63), COOCH$_3$(0.37), SO$_2$CH$_3$(0.60), C$_6$H$_5$(0.06), 2-Pyridyl(0.33), CN(0.56) and NO$_2$(0.71), and examples of a group having a σm value of 0 or below include H (0.00), CH$_3$(−0.07), NH$_2$(−0.16), N(CH$_3$)$_2$(−0.16) and Si(CH$_3$)$_3$(−0.04).

Examples of a base according to the invention are as follows:

| | pKa (For guidance, the pKa of triethylamine is 10.75) |
|---|---|
| [Formula (III)] | |
| Triethanolamine | 7.76 |
| 3-Cyanopropylamine | 7.80 |
| 1,1,1-Tris(hydroxymethyl)methylamine | 8.30 |

-continued

| | pKa (For guidance, the pKa of triethylamine is 10.75) |
|---|---|
| [Formula (IV)] | |
| Imidazole | 6.99 |
| 1-Methylimidazole | 6.95 |
| 2,4-Dimethylimidazole | 8.36 |
| [Formula (V)] | |
| Morpholine | 8.50 |
| N-methylmorpholine | 7.38 |
| N-ethylmorpholine | 7.67 |
| [Formula (VI)] | |
| 2,4-Dimethylpyridine | 6.99 |
| 2,4,6-Trimethylpyridine | 7.43 |

Of these bases, the bases represented by formula (III) or (V) are preferred over the others, those of formula (III) are preferred by far, and triethanolamine is preferred in particular.

At a time of dissolution, the temperature can be raised up to the boiling point of a solvent used. However, it is appropriate that the dissolution be carried out at a temperature of 60° C. or below (and preferably 0° C. or above), especially 50° C. or below. Further, irradiation with ultrasonic waves is effective at accelerating the dissolution.

In a preferred method for dissolving dyes according to the invention, the dyes are added to water, methanol or a water-methanol mixture, and thereto a triethanolamine solution is added in an equimolar or slightly excessive amount.

It is preferable that the solutions are added to emulsions just after dissolving dyes therein. When storage of them is required, they are kept at 30° C. or below, preferably 20° C. or below, until the time comes when they will be used. During the storage, there is a possibility that the dyes are precipitated out because of a solubility drop by cooling. Therefore, it is required that the dye concentration be set lower than the saturation solubility at a storage temperature. Specifically, the suitable concentrations of dyes in solutions are from 0.2 to 10 weight %, preferably from 0.4 to 5 weight %.

The present silver halide photographic emulsions and silver halide photographic materials are described below in detail.

The present sensitizing dyes (ditto for other sensitizing dyes) may be added to the present silver halide emulsions at any period during the emulsion-making process as long as it has hitherto been recognized to be useful. For instance, they may be added during the process of forming silver halide grains and/or the period before desalting, during the desalting process and/or the period from after desalting to before the start of chemical ripening, as disclosed in U.S. Pat. Nos. 2,735,766, 3,628,960, 4,183,756 and 4,225,666, JP-A-58-184142 and JP-A-60-196749, or their addition may be performed just before chemical ripening, during the process of chemical ripening, or during any period or any process so long as it is after chemical ripening and before application of an emulsion coating, as disclosed in JP-A-58-11392. In addition, as disclosed in U.S. Pat. No. 4,225,666 and JP-A-58-7629, one compound alone or a combination of one compound and a compound having a different type of structure may be divided into several portions and added during separate periods or processes, e.g., during the grains-forming process and the chemical ripening process or a period after completion of chemical ripening. In the case of a compound divided into several portions and added during different periods, compound and compounds combined therewith may vary in kind from one period to another.

Supersensitizers useful for spectral sensitization in the invention include the pyridylamino compounds, the triazinylamino compounds and the azolium compounds as disclosed in U.S. Pat. Nos. 3,511,664, 3,615,613, 3,615,632, 3,615,641, 4,596,767, 4,945,038, 4,965,182 and 4,965,182. The methods disclosed in these documents are suitable as directions for use of supersensitizers.

Silver halide grains in the present silver halide emulsions may have any of halide compositions including chloride, bromide, chlorobromide, iodobromide, iodochloride and chloroiodobromide. When the present silver halide emulsions are used in color photographic paper, for instance, it is advantageous for them to be silver chlorobromide emulsions from the viewpoint of speeding up and simplifying photographic processing. As the silver chlorobromide emulsions, those having chloride contents of at least 95 mole %, inclusive of silver chloride, silver chlorobromide and silver chloroiodobromide, can be used favorably. In the case of using them in picture-taking color films (negative and reversal), silver iodobromide emulsions are preferable. As to the silver iodobromide emulsions, those having bromide contents of at least 95 mole %, inclusive of silver bromide, silver iodobromide and silver chloroiodobromide, can be used to advantage.

The suitable average size of silver halide grains (expressed in terms of the number average of the diameters of circles having areas equivalent to projected areas of grains) contained in a silver halide emulsion used in the invention is from 0.1 to 2 $\mu$m.

And it is appropriate that the size distribution of the silver halide grains be the so-called monodisperse distribution, specifically a distribution having a variation coefficient of 20% or below, preferably 15% or below, far preferably 10% or below (wherein the term "variation coefficient" is defined as the value obtained by dividing the standard deviation of the grain size distribution by the average grain size). For the purpose of imparting a wide latitude to the resulting photographic material, on the other hand, it is effective to use a blend of monodisperse emulsions in one and the same layer or coat monodisperse emulsions in multiple layers.

The shape of silver halide grains contained in the present photographic emulsions may be any of regular crystal shapes, such as those of cube, octahedron and tetradecahedron, irregular ones, such as spherical and tabular shapes, and mixtures thereof. In the present photographic emulsions, it is appropriate that at least 50%, preferably at least 70%, far preferably at least 90%, of the silver halide grains contained have such a regular crystal shape as mentioned above. The cases in which the silver halide emulsion grains are cubic silver iodochloride or iodobromochloride grains and contain an average of 0.01 to 1.0 mole % iodide per mole of silver are especially preferred by the invention.

The emulsions used in the invention can be prepared using the methods described, e.g., in P. Glafkides, *Chimie et Phisique Photographigue*, Paul Montel (1967); G. F. Duffin, *Photographic Emulsion Chemistry*, The Focal Press (1966); and V. L. Zelikman et al., *Making and Coating Photographic Emulsion*, The Focal Press (1964). Specifically, the method used may be any of acidic, neutral and ammoniacal methods. Suitable methods for reacting a water-soluble silver salt with a water-soluble halide include a single jet method, a double jet method and a combination thereof. In addition, a method in which silver halide grains are produced in the presence of excess silver ion (the so-called reverse mixing method) can be employed in the invention. On the other hand, the so-called controlled double jet method, in which the pAg of the liquid phase in which silver halide grains are to be precipitated is maintained constant, may be also be employed. By using this method, it becomes possible to prepare silver halide emulsion grains having a regular crystal shape and sizes close to uniform.

The present dyes may be used in combination with other spectral sensitizing dyes.

The amounts of the present dyes added, though they vary depending on the shape and the size of silver halide grains to which the dyes are added, can be within the range of $1 \times 10^{-6}$ to $8 \times 10^{-3}$ mole per mole of silver halide. When the grain size of silver halide is from 0.2 to 1.3 μm, for instance, the suitable amount of the dyes added is from $2 \times 10^{-6}$ to $3.5 \times 10^{-3}$ mole, preferably from $7.5 \times 10^{-6}$ to $1.5 \times 10^{-3}$ mole, per mole of silver halide.

In general the silver halide emulsions used in the invention are sensitized chemically. Methods usable for chemical sensitization include the so-called gold sensitization methods using gold compounds (e.g., the methods disclosed in U.S. Pat. Nos. 2,448,060 and 3,320,069), sensitization methods using metals, such as iridium, platinum, rhodium and palladium (e.g., the methods disclosed in U.S. Pat. Nos. 1,448,060, 2,566,245 and 2,566,263), sensitization methods using sulfur-containing compounds (e.g., the method disclosed in U.S. Pat. No. 2,222,264), selenium sensitization methods using selenium compounds, tellurium sensitization methods using tellurium compounds, and reduction sensitization methods using tin salts, thiourea dioxide or polyamine (e.g., the methods disclosed in U.S. Pat. Nos. 2,487,850, 2,518,698 and 2,521,92). These sensitization methods may be used alone or as a combination thereof.

To silver halide emulsions used in the invention, various compounds or precursors thereof can be added for the purpose of preventing photographic materials from fogging during production, storage or photographic processing, or stabilizing photographic properties. Examples of compounds used suitably for such a purpose include the compounds disclosed in JP-A-62-215272, pp. 39–72. In addition, it is also advantageous to use the 5-arylamino-1,2,3,4-thiatriazole compounds (whose aryl moieties each have at least one electron-attracting group) disclosed in European Patent No. 0 447 647.

The silver halide emulsions prepared in accordance with the invention can be used in both color and black-and-white photographic materials. Examples of a color photographic material in which the present emulsions are used to particular advantage include color photographic paper, picture-taking color films and color reversal films, and those of a black-and-white photographic material include X-ray films, picture-taking films for amateur use, and films for graphic arts.

Various arts and a wide variety of inorganic and organic materials as described in *Research Disclosure*, No. 308119 (1989), and supra, No. 37038 (1995), are applicable to the present silver halide photographic materials.

In addition to the above, the arts and the inorganic and organic materials applicable to color photographic materials in which the present silver halide photographic emulsions can be used are disclosed in EP-A2-436938, specifically the locations set forth below, and the documents cited below.

| Item | Location in which the corresponding item is disclosed |
|---|---|
| 1) Layer structure | page 146, line 34, to page 147, line 25 |
| 2) Silver halide emulsion | page 147, line 26, to page 148, line 12 |
| 3) Yellow coupler | page 137, line 35, to page 146, line 33, and page 149, lines 21–23 |
| 4) Magenta coupler | page 149, lines 24–28; EP-A1-421453, page 3, line 5, to page 25, line 55 |
| 5) Cyan coupler | page 149, lines 29–33; EP-A2-432804, page 3, line 28, to page 40, line 2 |
| 6) Polymer coupler | page 149, lines 34–38; EP-A2-435334, page 113, line 39, to page 123, line 37 |
| 7) Colored coupler | page 53, line 42, to page 137, line 34, and page 149, lines 39–45 |
| 8) Other functional couplers | page 7, line 1, to page 53, line 41; page 149, line 46, to page 150, line 3; EP-A2-435334, page 3, line 1, to page 29, line 50 |
| 9) Antiseptic | page 150, lines 25–28 |
| 10) Formaldehyde scavenger | page 149, lines 15–17 |
| 11) Other additives | page 153, lines 38–47; EP-A1-421453, page 75, line 21, to page 84, line 56 |
| 12) Dispersing method | page 150, lines 4–24 |
| 13) Support | page 150, lines 32–34 |
| 14) Thickness and physical properties of film | page 150, lines 35–49 |
| 15) Color developing process | page 150, line 50, to page 151, line 47 |
| 16) Desilvering process | page 151, line 48, to page 152, line 53 |
| 17) Automatic developing machine | page 152, line 54, to page 153, line 2 |
| 18) Washing-stabilizing process | page 153, lines 3–37 |

The invention will now be illustrated in more detail by reference to the following examples, but these examples should not be construed as limiting the scope of the invention.

EXAMPLE 1

<Preparation of Dye Solutions>

Dyes set forth in Table 1 were each weighed in a quantity of 1.0 g, admixed with a base specified in Table 1, and added to 200 ml of a 1:1 mixture of methanol and water.

Each of the resulting mixtures was irradiated with ultrasonic waves for 30 minutes at 25° C., and then observed visually on the degree of dissolution and thereby rated as "good" when it was in a completely dissolved state, "poor" when it left some residue, or "failed" when it was in a hardly dissolved state. Further, the pH value of each solution was measured with a pH-meter.

<Measurement of Solution Stability>

The dye solutions prepared were aged for 7 days at 25° C., and their absorbance values before and after the aging were compared. The remaining rate of each dye was expressed in terms of a ratio between absorbance values after and before aging of the dye solution.

The examination results obtained are shown in Table 1.

TABLE 1

| No. | Dye | Base (pKa) | Number of equivalents to dye | Degree of dissolution | pH Value of dye solution | Stability (25° C. for 7 days) | note |
|---|---|---|---|---|---|---|---|
| 1 | S-14 | Absent | — | failed | 6.1 | — | comparison |
| 2 | S-14 | pyridine (5.23) | 1.0 | failed | 5.7 | — | comparison |
| 3 | S-14 | triethanolamine (7.76) | 1.0 | good | 7.3 | 99.2% | invention |
| 4 | | | 1.2 | good | 7.4 | 99.1% | |
| 5 | S-14 | Triethylamine (10.75) | 0.8 | poor | 6.9 | 95.0% (a precipitate formed) | comparison |
| 6 | | | 1.0 | good | 9.4 | 67.5% | |
| 7 | S-14 | N,N-diisopropylethylamine (11.44) | 1.0 | good | 10.1 | 42.3% | comparison |
| 8 | S-14 | 1,8-diazabicyclo-7-undecene (11.5) | 1.0 | good | 10.8 | 33.5% | comparison |
| 9 | S-37 | Absent | — | failed | 6.2 | — | comparison |
| 10 | S-37 | triethanolamine (7.76) | 1.0 | good | 7.4 | 99.6% | invention |
| 11 | | | 1.2 | good | 7.5 | 99.6% | |
| 12 | S-37 | N-methylmorpholine (7.38) | 1.0 | good | 7.1 | 99.7% | invention |
| 13 | S-37 | 2,4,6-trimethylpyridine (7.43) | 1.0 | good | 7.2 | 99.5% | invention |
| 14 | S-37 | Triethylamine (10.75) | 0.8 | poor | 7.1 | 99.1% | comparison |
| 15 | | | 1.0 | good | 9.6 | 92.5% | |
| 16 | S-37 | 1,8-diazabicyclo-7-undecene (11.5) | 1.0 | good | 11.0 | 45.2% | comparison |
| 17 | S-39 | Absent | — | failed | 6.3 | — | comparison |
| 18 | S-39 | triethanolamine (7.76) | 1.0 | good | 7.5 | 99.8% | invention |
| 19 | | | 1.2 | good | 7.6 | 99.8% | |
| 20 | S-39 | Triethylamine (10.75) | 0.8 | poor | 7.4 | 98.5% | comparison |
| 21 | | | 1.0 | good | 9.7 | 93.0% | |

As can be seen from the results shown in Table 1, solutions containing dyes in high concentrations can be obtained using the present method for preparing dye solutions, and no dyes were precipitated out of these solutions during long-term storage. In addition, the dyes were hard to decompose even after aging the dye solutions because the present method caused a slight rise in solution pH. Moreover, the present method for preparing dye solutions brought about only a small change in solution pH even when bases were used in excessive amounts, so it can be said that the present method has excellent suitability for production on an industrial scale.

EXAMPLE 2

<Preparation of Emulsions>

Preparation of Emulsion A-1 (Cubic Emulsion Grains):

After 1,000 ml of a 3% aqueous solution of lime-processed gelatin was adjusted to pH=5.5 and pCl=1.7, an aqueous solution containing 2.12 moles of silver nitrate and an aqueous solution containing 2.2 moles of sodium chloride were simultaneously added thereto at 66° C. with vigorous stirring. At a time when 90% of the silver nitrate addition was finished, an aqueous solution of potassium iodide was added with vigorous stirring in an amount that the percentage of iodide content became 0.2 mole % per mole of finished silver halide. The reaction mixture was subjected to desalting treatment at 40° C., admixed with 168 g of lime processed gelatin, and adjusted to pH=5.5 and pCl=1.8. The emulsion thus obtained was a cubic silver iodochloride emulsion having a grain size of 0.75 μm, expressed in terms of the sphere-equivalent diameter, and a variation coefficient of 11% with respect to the grain size distribution.

To the emulsion dissolved at 60° C., the dye solution No. 3 prepared and aged in Example 1 was added in an amount of $4.0 \times 10^{-4}$ mole, on a dye basis, per mole of silver halide. The resulting emulsion was ripened for 120 minutes. The thus prepared emulsion was referred to as Emulsion A-1.

Emulsions A-2 to A-11 were prepared in the same manner as Emulsion A-1, except that the dye solution No. 3 was replaced by dye solutions set forth in Table 2, respectively. In addition, Emulsion A-0 was prepared without adding any dye solution.

<Preparation of Samples>

The surface of a paper support covered with polyethylene resin on both sides was subjected to a corona discharge operation, provided with a gelatin subbing layer containing sodium dodecylbenzenesulfonate, and further coated with an emulsion layer and a protective layer to prepare a silver halide color photographic material Sample T(1) having the following layer structure. Coating compositions used were prepared in the manner described below.

Preparation of Coating Solution for Emulsion Layer

A yellow coupler (ExY) in the amount of 57 g, 7 g of a color image stabilizer (Cpd-1), 4 g of a color image stabilizer (Cpd-2), 7 g of a color image stabilizer (Cpd-3) and 2 g of a color image stabilizer (Cpd-8) were dissolved in a mixture of 21 g of a solvent (Solv-1) and 80 ml of ethyl acetate, and then dispersed in an emulsified condition into 220 g of a 23.5 weight % aqueous gelatin solution containing 4 g of sodium dodecylbenzenesulfqnate by use of a high speed agitation emulsification apparatus (dissolver), and further thereto 900 g of water was added. Thus, emulsified Dispersion A was prepared.

The emulsified Dispersion A thus prepared was mixed with and dissolved in Emulsion A-1. By use of this mixture, a coating solution having the composition mentioned below was prepared for the first layer. The emulsion coverage is shown on a silver basis.

A coating solution for the protective layer was prepared in the same manner as used in preparing the coating solution for the emulsion layer. In each layer, sodium 1-oxy-3,5-dichloro-s-triazine (H-1), Hardener (H-2) and Hardener (H-3) were used as gelatin hardener. In addition, Ab-1, Ab-2, Ab-3 and Ab-4 were added to each layer so that their total coverage values were 15.0 mg/m², 60.0 mg/m², 5.0 mg/m² and 10.0 mg/m², respectively.

(H-1) Hardener

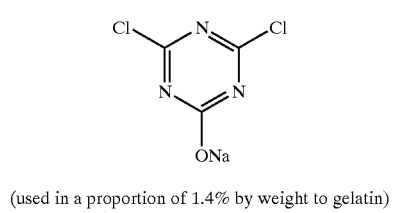

(used in a proportion of 1.4% by weight to gelatin)

(H-2) Hardener

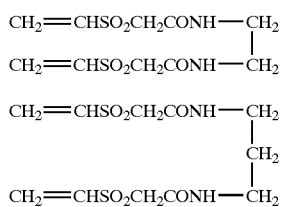

(H-3) Hardener (AB-1) Antiseptic

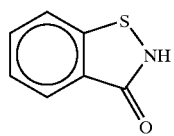

(Ab-2) Antiseptic

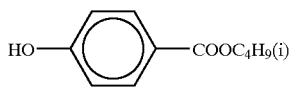

(Ab-3) Antiseptic

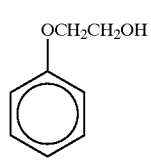

(Ab-4) Antiseptic

1:1:1:1 (by mole) Mixture of a, b, c and d

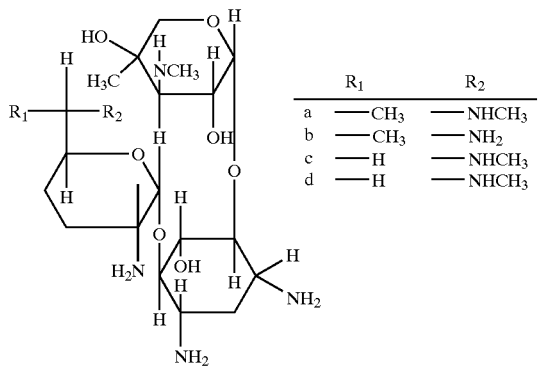

| | $R_1$ | $R_2$ |
|---|---|---|
| a | —$CH_3$ | —$NHCH_3$ |
| b | —$CH_3$ | —$NH_2$ |
| c | —H | —$NHCH_3$ |
| d | —H | —$NHCH_3$ |

(Layer Structure)

The composition of each layer is described below. The figures on the right side designate the coverage (g/$^2$) of the ingredients corresponding thereto. As to the silver halide emulsion, the figure represents the coverage based on silver.

Support

Polyethylene resin-laminated paper which contained white pigments ($TiO_2$ content: 16 weight %, ZnO content: 4 weight %), a brightening agent (4,4'-bis(5-methylbenzoxazolyl)-stilbene content: 0.03 weight %) and a bluish dye (ultramarine) in the polyethylene resin on the side of the first layer.

| Emulsion Layer: | |
|---|---|
| Emulsion A-1 | 0.24 |
| Gelatin | 1.25 |
| Yellow coupler (ExY) | 0.57 |
| Color image stabilizer (Cpd-1) | 0.07 |
| Color image stabilizer (Cpd-2) | 0.04 |
| Color image stabilizer (Cpd-3) | 0.07 |
| Color image stabilizer (Cpd-8) | 0.02 |
| Solvent (Solv-1) | 0.21 |
| Protective Layer: | |
| Gelatin | 1.00 |
| Acryl-modified polyvinyl alcohol (modification degree: 17%) | 0.04 |
| Liquid paraffin | 0.02 |
| Surfactant (Cpd-13) | 0.01 |

The structural formulae of the compounds used herein are illustrated below:

(ExY) Yellow Coupler

70:30 (by mole) Mixture of (1) and (2):

(1)

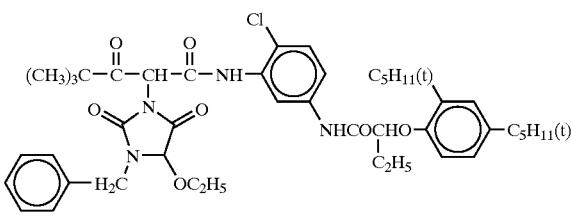

(2)

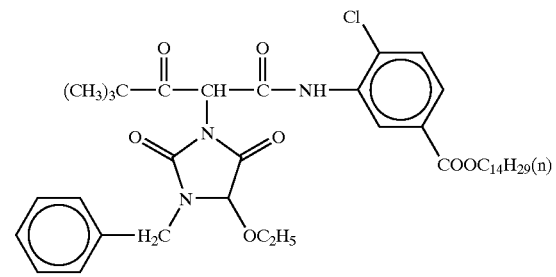

(Cpd-1) Color Image Stabilizer

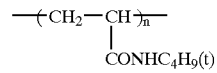

number average molecular weight: 60,000

(Cpd-2) Color Image Stabilizer

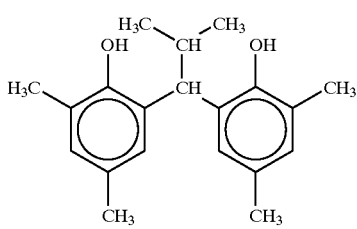

(Cpd-3) Color Image Stabilizer

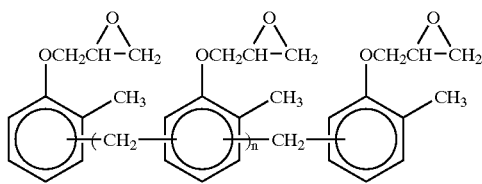

n=7–8 (on average)
(Cpd-8) Color Image Stabilizer

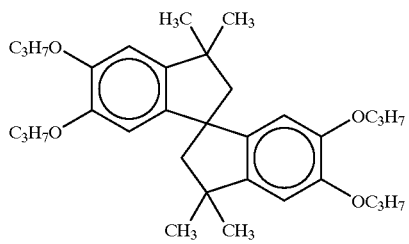

(Cpd-13) Surfactant
7:3 (by mole) mixture of (1) and (2)

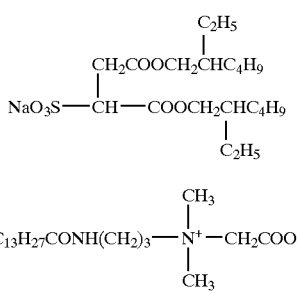

(Solv-1) Solvent

Sample T(0) and Samples T(2) to T(11) were each prepared in the same manner as Sample T (1), except that Emulsion A-1 was replaced by Emulsion A-0 and Emulsions A-2 to A-11, respectively.
<Color Photographic Processing>
The following experiments were made in order to examine photographic characteristics of each sample.
(Sensitometry)
Gradation exposure for sensitometry was given to Samples T(0) to T(11) by use of a sensitometer (Model FWH, made by Fuji Photo Film Co., Ltd.). In the sensitometer, an SP-1 filter was mounted, and the exposure was performed for 5 seconds. After the exposure, color photographic processing was performed in accordance with the following process using processing solutions described below.
The processing process is described below.
(Color Photographic Processing)
The photosensitive Sample T(0) was worked into 127 mm-wide rolls, exposed imagewise by means of a Minilabo Printer Processor PP1258AR, and then subjected to continuous processing (running test) in accordance with the following process until the volume of a replenisher used for color development reached twice the liquid volume in the color developing tank.

| Processing Step | Temperature | Time | Amount* replenished |
| --- | --- | --- | --- |
| Color development | 38.5° C. | 90 sec | 45 ml |
| Bleach-fix | 38.0° C. | 45 sec | 35 ml |
| Rinse (1) | 380.0° C. | 20 sec | — |
| Rinse (2) | 38.0° C. | 20 sec | — |
| Rinse (3)** | 38.0° C. | 20 sec | — |
| Rinse (4)** | 38.0° C. | 20 sec | 121 ml |

(note)
*per $m^2$ of photographic material
**A rinse cleaning system RC50D made by Fuji Photo Film Co., Ltd. was attached to Rinse (3), the rinsing solution was taken out of the Rinse (3) and sent into the reverse osmosismodule (RC50D) by means of a pump. The permeate the module tank sent out was supplied to Rinse (4), and the condensate was sent back to Rinse (3). The permeate volume of the reverseosmosis module was controlled by pump pressure so as to keep the range of 50 to 300 ml/min, and circulation of the solution was continued for 10 hours a day while regulating thetemperature. The rinsing order was 1-2-3-4, and a 4-stage counter-current system was applied.

After the foregoing color photographic processing, each sample was washed with 40° C. water for 3 minutes in order to eliminate the remaining sensitizing dye. Separately, it was confirmed that, even when each sample was washed for 3 minutes or longer, there occurred no change in reflection density of each sample Compositions of the processing solutions used are as follows:

| | Tank Solution | Replenisher |
| --- | --- | --- |
| <Color Developer> | | |
| Water | 800 ml | 800 ml |
| Dimethylpolysiloxane surfactant (Silicone KF353A, produced by Shin-Etsu Chemical Co., Ltd.) | 0.1 g | 0.1 g |
| Triisopropanolamine | 8.8 g | 8.8 g |
| Ethylenediaminetetraacetic acid | 4.0 g | 4.0 g |
| Polyethylene glycol (molecular weight: 300) | 10.0 g | 10.0 g |
| Sodium 4,5-dihydroxybenzene-1,3-disulfonate | 0.5 g | 0.5 g |
| Potassium chloride | 10.0 g | — |
| Potassium bromide | 0.040 g | 0.010 g |
| Triazinylaminostilbene type brightening agent (Hakkol FWA-SF, produced by Showa Chemical) | 2.5 g | 5.0 g |
| Sodium sulfite | 0.1 g | 0.1 g |
| Disodium N,N-bis(sulfonatoethyl)-hydroxylamine | 8.5 g | 11.1 g |
| N-ethyl-N-(β-methanesulfonamido-ethyl)-3-methyl-4-amino-4-amino-aniline 3/2 sulfate monohydrate | 5.0 g | 15.7 g |
| Potassium carbonate | 26.3 g | 26.3 g |
| Water to make | 1,000 ml | 1,000 ml |
| pH (at 25° C., adjusted with potassium hydroxide and sulfuric acid) | 10.15 | 12.50 |
| <Bleach-Fix Bath> | | |
| Water | 700 ml | 600 ml |
| Ammonium ethylenediaminetetra-acetatoferrate(III) | 47.0 g | 94.0 g |
| Ethylenediaminetetraacetic acid | 1.4 g | 2.8 g |
| m-Carboxybenzenesulfinic acid | 8.3 g | 16.5 g |
| Nitric acid (67%) | 16.5 g | 33.0 g |
| Imidazole | 14.6 g | 29.2 g |
| Ammonium thiosulfate (750 g/L) | 107.0 ml | 214.0 ml |

-continued

| | Tank Solution | Replenisher |
|---|---|---|
| Ammonium sulfite | 16.0 g | 32.0 g |
| Ammonium hydrogen sulfite | 23.1 g | 46.2 g |
| Water to make | 1,000 ml | 1,000 ml |
| pH (at 25° C., adjusted with acetic acid and aqueous ammonia) | 6.00 | 6.00 |
| <Rinsing Bath> | | |
| Sodium chloroisocyanurate | 0.02 g | 0.02 g |
| Deionized water (conductivity: 5 μs/cm or below) | 1,000 ml | 1,000 ml |
| pH (25° C.) | 6.5 | 6.5 |

Yellow reflection densities of the samples after photographic processing were measured with a TCD type densitometer made by Fuji Photo Film Co., Ltd. The measured densities were shown as relative values, with the density of Sample T(0) after processing being taken as 100. Owing to additional wash processing, these yellow densities didn't include residual colors of sensitizing dyes. Therefore, color formation of yellow coupler caused by fogging the emulsion was evaluated.

Evaluation results obtained are shown in Table 2.

TABLE 2

| Sample No. | Emulsion | Dye solution added | Yellow reflection density (fog) | note |
|---|---|---|---|---|
| T(0) | A-0 | — | 100 (standard) | blank |
| T(1) | A-1 | No. 3 | 97 | invention |
| T(2) | A-2 | No. 6 | 193 | comparison |
| T(3) | A-3 | No. 8 | 206 | comparison |
| T(4) | A-4 | No. 10 | 101 | invention |
| T(5) | A-5 | No. 11 | 103 | invention |
| T(6) | A-6 | No. 12 | 104 | invention |
| T(7) | A-7 | No. 13 | 105 | invention |
| T(8) | A-8 | No. 15 | 255 | comparison |
| T(9) | A-9 | No. 18 | 195 | invention |
| T(10) | A-10 | No. 19 | 105 | invention |
| T(11) | A-11 | No. 21 | 273 | comparison |

As is clear from the results shown in Table 2, heavy fogging occurred in the emulsions to which the dye solutions prepared using the comparative methods were added, whereas the emulsions using the dye solutions prepared using the present method were reduced in fogging. On checking the data shown in Tables 1 and 2, decomposition of dyes is thought to be a major cause of such an increase in fogging.

Thus it is evident that dye solutions having high concentrations and high stability can be prepared only when they are prepared in accordance with the present method and silver halide photographic materials reduced in fogging can be produced only by the use of emulsions to which the present dye solutions are added.

The entire disclosure of each and every foreign patent application: Japanese Patent Application No. 2002-238176, from which the benefit of foreign priority has been claimed in the present application is incorporated herein by reference, as if fully set forth.

What is claimed is:

1. A method of preparing a dye solution, which comprises dissolving a counter ion-free dye and a base having a pKa value of from 6.6 to 9.0 in a solvent having a relative dielectric constant of at least 10 at 20° C.

2. The method of preparing a dye solution as described in claim 1, wherein the dye is a compound represented by the following formula (I):

$$Dye\text{---}((A)_r Q)_q \qquad (I)$$

wherein Dye represents a dye moiety; A represents a linkage group; Q represents a dissociable group; r represents 0 or 1 and q represents an integer of 1 or more, provided that at least one Q is selected from the group consisting of —COOH, —CONHSO$_2$R, —SO$_2$NHCOR, —SO$_2$NHSO$_2$R and —CONHCOR and R represents an alkyl group, an aryl group, a heterocyclic group, an alkoxy group, an aryloxy group, a heterocyclyloxy group or an amino group.

3. The method of preparing a dye solution as described in claim 1, wherein the dye is a compound represented by the following formula (II):

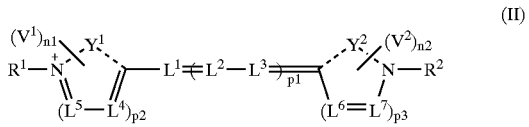

wherein $R^1$ and $R^2$ each represent a substituted or unsubstituted alkyl, aryl or heterocyclic group, provided that at least one of $R^1$ and $R^2$ is substituted with —COOH, —CONHSO$_2$R$^3$, —SO$_2$NHCOR$^3$, —SO$_2$NHSO$_2$R$^3$ or —CONHCOR$^3$; $R^3$ represents an alkyl group, an aryl group, a heterocyclic group, an alkoxy group, an aryloxy group, a heterocyclyloxy group or an amino group; $Y^1$ and $Y^2$ each represent atom group constituting a 5- or 6-membered nitrogen-containing heterocyclic ring which may be condensed together with a carbon ring or the other heterocyclic ring; $V^1$ and $V^2$ each represents a substituent; $n^1$ and $n^2$ each represent an integer of 0 or more, and when $n^1$ and $n^2$ each are 2 or more, $V^1$s and $V^2$s each may be the same or different; $L^1$, $L^2$, $L^3$, $L^4$, $L^5$, $L^6$ and $L^7$ each represent a methine group; and $p^1$ represents 0, 1, 2 or 3, and $p^2$ and $p^3$ each represent 0 or 1, and when $p^1$ is 2 or 3, the repeated $L^2$s and $L^3$s each may be the same as or different from each other.

4. The method of preparing a dye solution as described in claim 1, wherein the pKa value of the base is from 7.0 to 8.0.

5. The method of preparing a dye solution as described in claim 1, wherein the base is a compound represented by the following formula (III), (IV), (V) or (VI):

wherein $R^{11}$, $R^{12}$ and $R^{13}$ each represent a hydrogen atom, or a substituted or unsubstituted alkyl group, provided that at least one of $R^{11}$, $R^{12}$ and $R^{13}$ is an alkyl group substituted with a radical having a σm value of 0 or more;

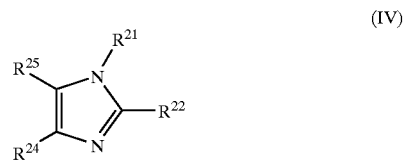

wherein $R^{21}$, $R^{22}$, $R^{24}$ and $R^{25}$ each represent a hydrogen atom or a substituent, and $R^{24}$ and $R^{25}$ may combine with each other to form a carbon ring or a heterocyclic ring;

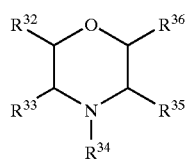
(V)

wherein $R^{32}$, $R^{33}$, $R^{34}$, $R^{35}$ and $R^{36}$ each represent a hydrogen atom or a substituent;

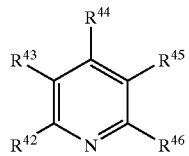
(VI)

wherein $R^{42}$ $R^{43}$ $R^{44}$ $R^{45}$ and $R^{46}$ each represent a hydrogen atom or a substituent, provided that at least two of $R^{42}$, $R^{43}$, $R^{44}$, $R^{45}$ and $R^{46}$ are unsubstituted alkyl groups or alkyl groups substituted with radicals having σm values of 0 or less, and $R^{42}$ and $R^{43}$, $R^{43}$ and $R^{44}$, $R^{44}$ and $R^{45}$, or $R^{45}$ and $R^{46}$ may combine with each other to form a carbon ring or a heterocyclic ring.

6. The method of preparing a dye solution as described in claim 1, wherein the solvent is one of a solvent having a relative dielectric constant of at least 20 at 20° C. and a mixture of two or more solvents having a relative dielectric constant of at least 20 at 20° C.

7. The method of preparing a dye solution as described in claim 6, wherein the solvent is one of water, methanol, and a mixture of water and methanol.

8. A method of producing a silver halide emulsion, which comprises adding at least one of dye solutions prepared by the method described in claim 1.

9. A silver halide emulsion comprising at least one of dye solutions prepared by the method described in claim 1.

10. A method of producing a silver halide photographic material, which comprises coating on a support at least one silver halide emulsion layer containing the silver halide emulsion described in claim 9.

11. A silver halide photographic material, comprising a support and at least one silver halide emulsion layer containing the silver halide emulsion described in claim 9.

* * * * *